United States Patent

Adachi

[19]

[11] Patent Number: 6,078,410
[45] Date of Patent: *Jun. 20, 2000

[54] IMAGE PROCESSING APPARATUS

[75] Inventor: Yasushi Adachi, Nara, Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,712

[22] Filed: Dec. 4, 1996

[30] Foreign Application Priority Data

Dec. 28, 1995 [JP] Japan .................................. 7-344239

[51] Int. Cl.$^7$ ...................................................... G03F 3/08
[52] U.S. Cl. ........................ 358/522; 358/518; 382/156; 382/162; 382/168
[58] Field of Search ..................................... 382/156, 163, 382/176, 168, 169, 171, 172; 358/521, 522, 500

[56] References Cited

U.S. PATENT DOCUMENTS

| | | | |
|---|---|---|---|
| 4,791,678 | 12/1988 | Iwase et al. | 382/169 |
| 4,965,443 | 10/1990 | Yamasaki et al. | 250/201.7 |
| 5,187,592 | 2/1993 | Sugiyama et al. | 358/430 |
| 5,208,663 | 5/1993 | Hiratsuka | 358/500 |
| 5,317,420 | 5/1994 | Kuwahara | 358/463 |
| 5,608,819 | 3/1997 | Ikeuchi | 382/156 |
| 5,657,395 | 8/1997 | Hirota | 382/163 |
| 5,748,773 | 5/1998 | Tashiro | 382/169 |
| 5,825,937 | 10/1998 | Ohuchi et al. | 382/261 |

FOREIGN PATENT DOCUMENTS

| | | |
|---|---|---|
| 155796 | 11/1989 | Japan . |
| 5236277 | 9/1993 | Japan . |
| 6189128 | 7/1994 | Japan . |

Primary Examiner—Andrew W. Johns
Assistant Examiner—Gregory Desire
Attorney, Agent, or Firm—Dike, Bronstein, Roberts & Cushman, LLP; David G. Conlin

[57] ABSTRACT

An image processing apparatus includes a feature data extracting circuit for detecting feature data indicative of density characteristics of a document based on image signals inputted from an input terminal, a density correction table selecting circuit composed of a neural circuit network which is learned beforehand so as to recognize image characteristics based on the feature data, and a density correcting circuit for selecting a density correction table in accordance with image characteristics based on a selection signal from the density correction table selecting circuit so that the density of image signals is corrected based on the density correction table. As a result, characteristics of the document are extracted, so that the density of the image signals can be corrected based thereon. As a result, the density characteristics of the document are extracted, and a density correction can be performed based on the extracted density characteristics, thereby obtaining a high quality recorded image with respect to documents of various kinds. Furthermore, by adopting the neural circuit network, the density of the image signals can be corrected accurately at high speed.

20 Claims, 15 Drawing Sheets

IMAGE PROCESSING APPARATUS

FIELD OF THE INVENTION

The present invention relates to an image processing apparatus provided in a digital copying machine, a scanner, etc., which attains an improved quality of a recorded image (copied image of a document) by applying an optimum density correction to an image signal obtained by scanning a document in accordance with characteristics of the document.

BACKGROUND OF THE INVENTION

Conventionally, in digital copying machines, scanners, etc., various processes are applied to an image signal obtained by reading a document by means of a CCD (Charge Coupled Device) image sensor to attain an improved quality of a recorded image (copied image of a document).

Generally known methods of improving an image quality of the recorded image include the method of applying an optimal density correction to the image signal obtained by reading the document in accordance with the features of the document. According to such image processing, for example, in the case of the document like newspaper, etc., a density correction is applied so as to remove the background, or the lack of hiding, and in the case of the document written by a pencil, a density correction is applied so as to thicken thin characters.

The described method of correcting the density of an image signal is adopted, for example, in the background density detecting device of Japanese Examined Patent Application No. 55796/1989 (Tokukohei 1-55796 (hereinafter referred to as Gazette (1)), wherein a runlength at each image density is obtained, the image density which maximizes the result of addition is determined to be the background density, and a density of an image signal is corrected based on the background density.

Another method of correcting the density of an image signal is adopted in the image processing device of Japanese Unexamined Patent Application No. 236277/1993 (Tokukaihei 5-236277) (hereinafter referred to as a Gazette (2)), wherein a histogram of an electric signal representing the document is prepared, and the features of the document are identified based on the features of the histogram (brightest level, darkest level, maximum frequency, and maximum frequency level) so as to covert the signal level of the electric signal based on the conversion table prepared in accordance with the information indicative of the described features.

A still another method of correcting the density of an image signal is disclosed in an image processing apparatus of Japanese Unexamined Patent Application No. 189128/1994 (Tokukaihei 6-189128) (hereinafter referred as Gazette (3)), wherein a coordinate of the colored portion of the document is specified by coordinate input means, and the image of the document is read by an image input apparatus, the density of the image of the document at the specified coordinate is detected by the background density detection means, the threshold value, based on which the background region is removed, is set based on the detected density, and the background is removed based on the threshold value, thereby correcting the density of the image signal.

However, according to the density correction method adopted in the background density detection device of Gazette (1), the image density which maximizes the result of addition of the runlength is determined to be the background density, and the background region is removed. Therefore, for example, in the case of a reversal document including outline characters in which a character region is in white and a background region is in black, a photographic document, etc., the black background region which maximizes the image density is removed. As this makes a difference in density between the character region and the background region smaller, a quality of the recorded image may be lowered. Therefore, the described density correction method is not applicable to various types of documents such as the described reversal document, etc.

On the other hand, when the density correction method adopted in the image processing apparatus of Gazette (2) is applied to the digital copying machine, a preliminarily scanning of the document is required when reading the image data to prepare a histogram of the document, thereby presenting the problem that the image processing speed is lowered. In order to identify the document with accuracy without applying the preliminarily scanning, a memory device of a large capacity is required for recording the image data of the document.

Additionally, in Gazette (2), the document type is identified by processing the feature data of the document based on the threshold value, and a density conversion table is prepared in accordance with the type of the document. However, the described method of processing based on only the threshold value does not permit the type of the document to be identified with accuracy, and it is difficult to prepare the density conversion table reflecting the characteristics of the feature data of the document in detail.

Thus, the method of the Gazette (2) does not permit the documents of various kinds to be identified with accuracy and the density correction to be performed with accuracy in accordance with the characteristics of the document, thereby presenting the problem that the quality of the recorded image is lowered depending on the type of the document.

According to the density correction method adopted in the image processing apparatus of the Gazette (3), as the process of specifying the background region is required by specifying the coordinate of the document, in the case of copying documents of various kinds, the process of specifying the coordinate is required for each document, thereby presenting the problem that an overall time required for processing the entire image becomes long.

SUMMARY OF THE INVENTION

An object of the present invention is to provide an image processing apparatus which offers a quality recorded image in accordance with documents of various types by extracting density characteristics of the document and applying a density correction process based on the extracted density characteristics and permits a density of image signals to be corrected accurately at high speed by adopting a neural circuit network.

In order to achieve the above object, an image processing apparatus in accordance with the present invention includes a feature data extracting circuit for extracting feature data indicative of density characteristics of a document based on image signals obtained by scanning the document, an image recognition circuit composed of a neural circuit network which is learned beforehand so as to recognize image characteristics of the document based on the feature data, and a density correcting circuit for correcting the density of the image signals in accordance with image characteristics based on image identification information from the image recognition circuit.

According to the image processing apparatus, the image characteristics of the document, which differ by the type of the document (character document, photographic document, colored background document such as newspaper, etc., or a mixed document of the above) are identified based on the image recognition information recognized by the neural circuit network. This eliminates the need of taking various parameters representing the image characteristics of the document into consideration multi-dimensionally, and permits the multi-dimensional identification process to be performed accurately relatively with ease. As a result, in correcting the density, fine features of the document, such as density characteristics of the image, etc., can be reflected. As this permits a density correction of the image signal to be performed accurately at high speed, a quality recorded image can be achieved in accordance with documents of various types.

The density correcting circuit preferably has plural kinds of the density correction tables for converting a density value of an image signal into a corrected density value in accordance with image characteristics, and a density correction table is selected in accordance with image characteristics based on the image recognition information, and performs a density correction of an image signal based on the selected density correction table.

As a result, the density correction table, based on which the density correction of the image signal is applied, can be selected in accordance with the density characteristics of the document, and the density correction of the image signal can be applied in accordance with the density characteristics of the document with high precision. Namely, the described arrangement permits an optimal selection of the density correction table, thereby permitting a desirable density correction of the image signal to performed with accuracy.

For a fuller understanding of the nature and advantages of the invention, reference should be made to the ensuing detailed description taken in conjunction with the accompanying drawings.

DESCRIPTION OF THE EMBODIMENTS

[First Embodiment]

The following descriptions will discuss one embodiment of the present invention.

Figure 1:
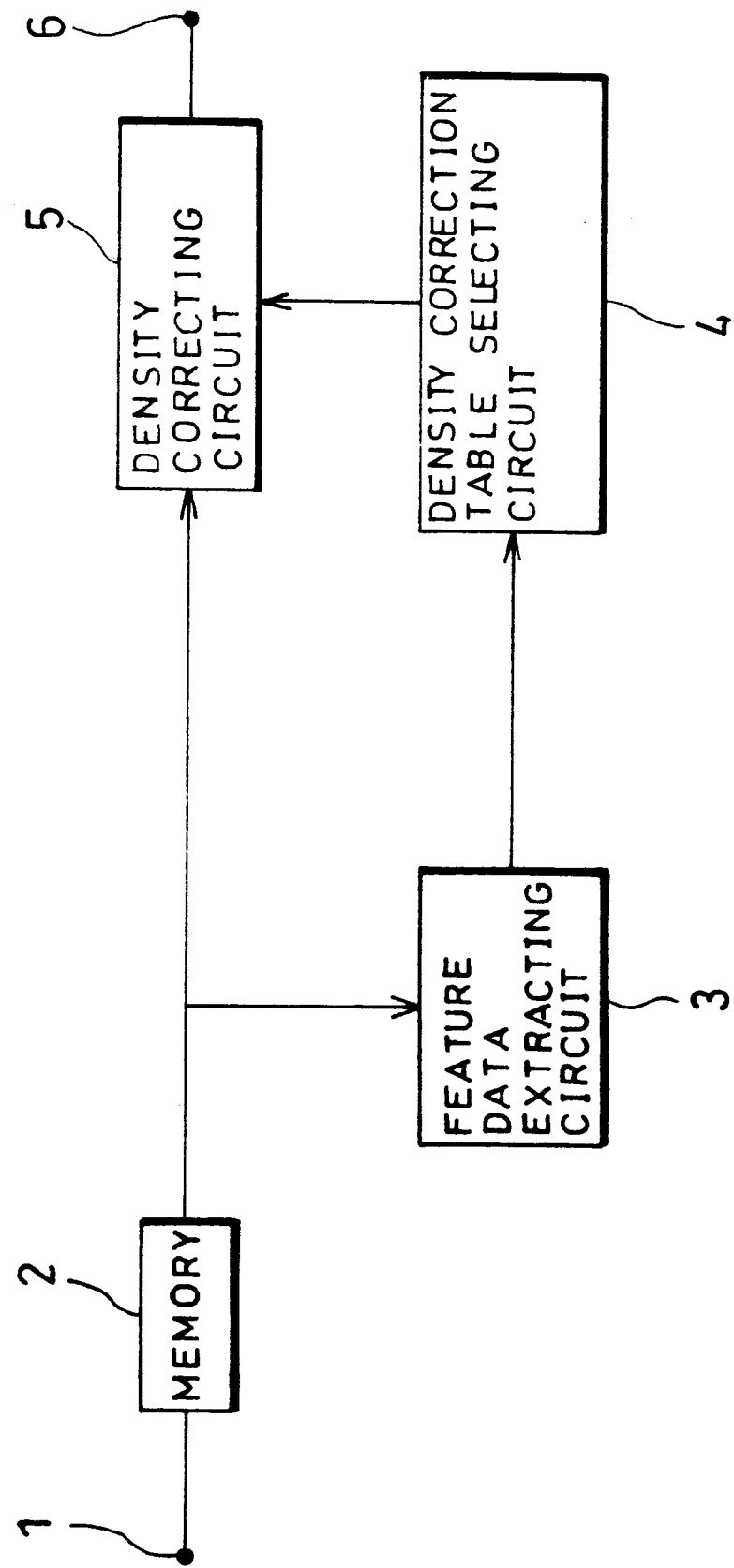
FIG. 1 is a block diagram schematically showing a structure of an image processing apparatus in accordance with one embodiment of the present invention.

As shown in FIG. 1, an image processing apparatus in accordance with the present embodiment is designed for a digital copying machine, a scanner, etc., and includes an input terminal 1, a memory 2 (memory means), a feature data extracting circuit 3 (feature data extraction means), a density correction table selecting circuit 4 (image recognition means), a density correcting circuit 5 (density correction means) and an output terminal 6.

The input terminal 1 is connected to scanning means such as a CCD image sensor, etc., (not shown), for scanning a document, and image signals obtained by scanning the document line by line by means of the scanning means are inputted to the input terminal 1. The image signals inputted to the input terminal 1 are outputted to the memory 2 at every scanning line.

The memory 2 has a memory area in which the image signals for several lines that are inputted from the input terminal 1 are stored at 256-level (8-bit) for each pixel. For example, in the memory 2, image signals in a local block composed of a target picture element and plural picture elements surrounding the target picture element are stored. The image signal stored in the memory 2 is outputted to the feature data extracting circuit 3 and the density correcting circuit 5.

The feature data extracting circuit 3 is provided for extracting data representing density characteristics (hereinafter referred to as feature data) such as density distribution of a document, etc., from the image signal stored in the memory 2.

For the feature data, identification data is adopted for identifying, for example, which of a character region, a photographic region and a background region of the document, the target pixel stored in the memory 2 belongs to. The identification data is defined as data obtained based on four parameters, i.e., a maximum signal level and a minimal signal level of the image signal stored in the memory 2, a sum of differential values between two successive pixels in a main scanning direction and a sum of differential values between two successive pixels in a sub-scanning direction.

For the feature data, density histogram information may be adopted as information indicative of density characteristics obtained from the image signal, information regarding the density distribution. In this case, a density histogram is prepared based on density histogram information with respect to image signals from the input terminal 1 line by line. Thus, the need of extracting the features of the document based on the target pixel in one line is eliminated, and this eliminates a need of storing the image signal in the memory 2. Therefore, by adopting the density histogram information with respect to the image signal line by line as feature data, the memory 2 can be omitted from the image processing apparatus. This density histogram will be explained in detail later.

In the present embodiment, explanations will be given through the case of adopting the density histogram information as feature data. Thus, the memory 2 is provided in the arrangement of the present embodiment, although the arrangement from which the memory 2 is omitted may be adopted.

The feature data extracting circuit 3 is arranged so as to extract the density histogram information (feature data) well representing characteristics of the document such as density distribution, etc., from the image signals, and output the resulting density histogram information to the density correction table selecting circuit 4.

On the other hand, the density correcting circuit 5 receives the image signal from the memory 2 and corrects the density of the image signal based on the density correction table.

Specifically, the density correcting circuit 5 includes a plurality kinds of density correction tables for use in converting density values of the image signals into corrected density values according to the image characteristics, and selects the density correction table among the plurality of density correction tables, that permits an optimal density correction to be performed in consideration of the characteristics of the document such as density distribution, etc., and corrects the density of the image signal based on the selected density correction table. The described selection of the density correction table is performed based on the selection signal from the density correction table selecting circuit 4 (to be described later). The detailed density correcting process in the density correcting circuit 5 will be explained later.

The image characteristics are defined to be characteristics of the document, which differ depending on the type of the document, i.e., a character document, a photographic document, a color background document in which the background is not in white, such as newspaper, or a mixed document.

The density correction table selecting circuit 4 is arranged so as to prepare a selection signal that permits the density correction table to be selected in accordance with the characteristics of the document in the density correcting circuit 5 based on the density histogram information from the feature data extracting circuit 3, and outputs the selection signal to the density correcting circuit 5. Specifically, the density correction table selecting circuit 4 identifies the features (density distribution) of the document based on the inputted density histogram information, and prepares a selection signal that permits the density correction table to be selected in accordance with the characteristics of the document by the density correcting circuit 5 based on the result of identification. The process of preparing the selection signal in the density correction table selecting circuit 4 will be explained in detail later.

Figure 2:
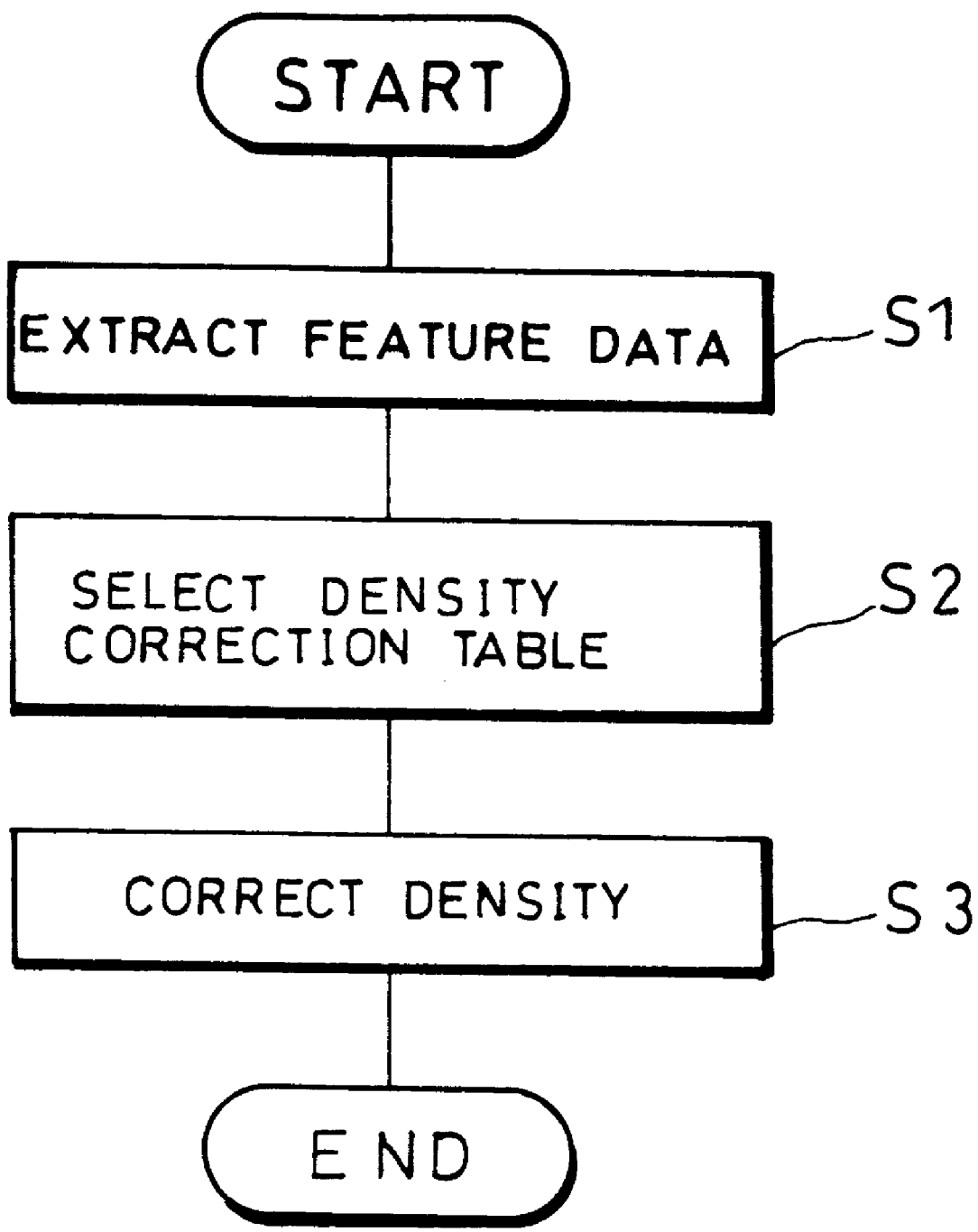
FIG. 2 is a flowchart showing a density correcting process in the image processing apparatus shown in FIG. 1.

In the image processing apparatus having the described arrangement, the flow of the density correcting process of the image signal to attain an improved quality of the recorded image will be explained in reference to the flow-chart of FIG. 2, and the block diagram of FIG. 1.

First, image signals for a plurality of lines of the document are read by the CCD image sensor, and are stored in the memory 2, and the density histogram information (feature data) is extracted by the feature data extracting circuit 3 from the stored image signal (S1).

Then, the extracted density histogram information is outputted to the density correction table selecting circuit 4. Thereafter, the density correction table selecting circuit 4 identifies the density distribution of the document, and outputs the selection signal that permits the density correction table to be selected in accordance with the characteristics of the document based on the result of identification to the density correcting circuit 5. Then, the density correcting circuit 5 selects the density correction table in accordance with the characteristics of the document based on the selection signal (S2).

Next, the density correcting circuit 5 corrects the density of the image signals of the document to be outputted from the memory 2 based on the selected density correction table (S3).

As described, the image processing apparatus in accordance with the present embodiment is arranged so as to correct image signals in order line by line. In the memory 2, the image signals for a plurality of lines are stored. Every time the stored image signals for one line are processed, the image signals of the next line are inputted from the input terminal 1 to be stored in the memory 2. As a result, the density correcting circuit 5 is permitted to perform a density correction of image signals successively.

Figure 3:
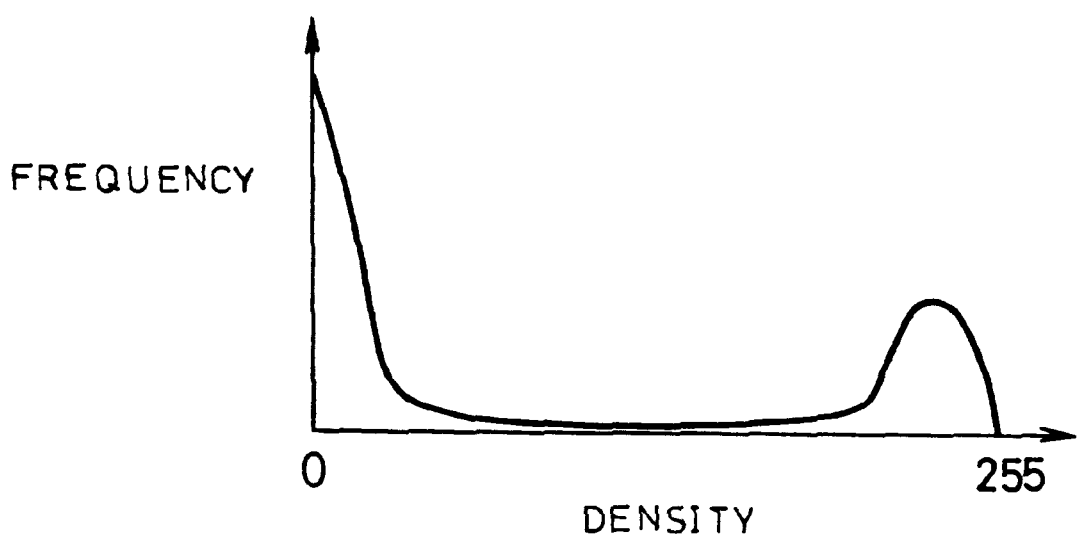
FIGS. 3(a)(b) are density histograms in which a background region is in white, and a character region is in black.
Figure 3:
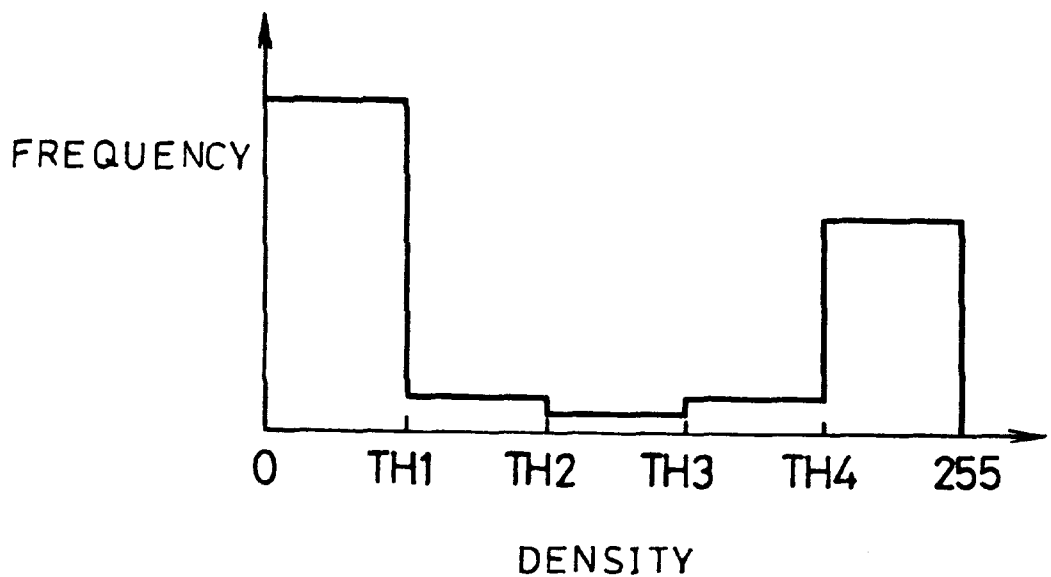
Figure 4:
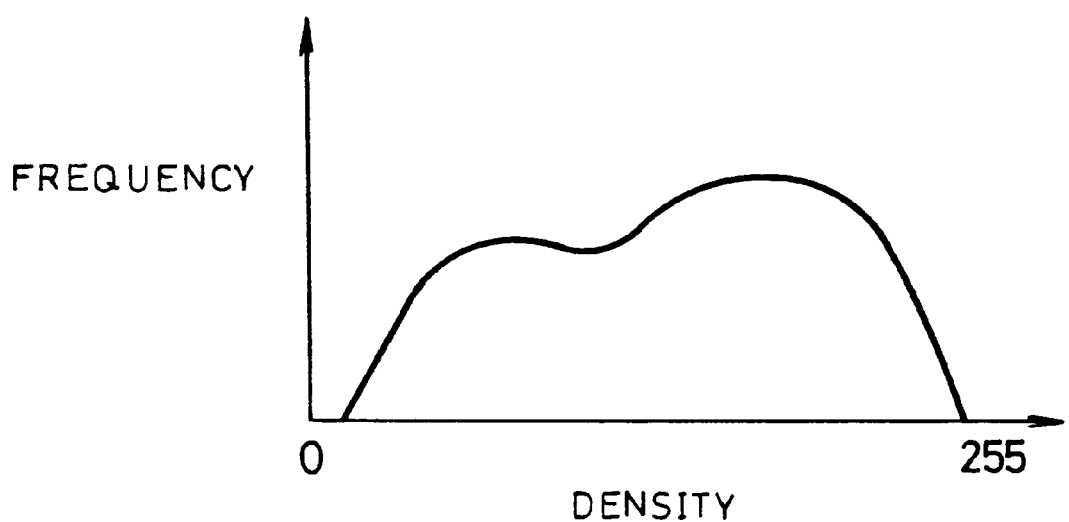
FIGS. 4(a) (b) are density histograms of a photographic document.
Figure 4:
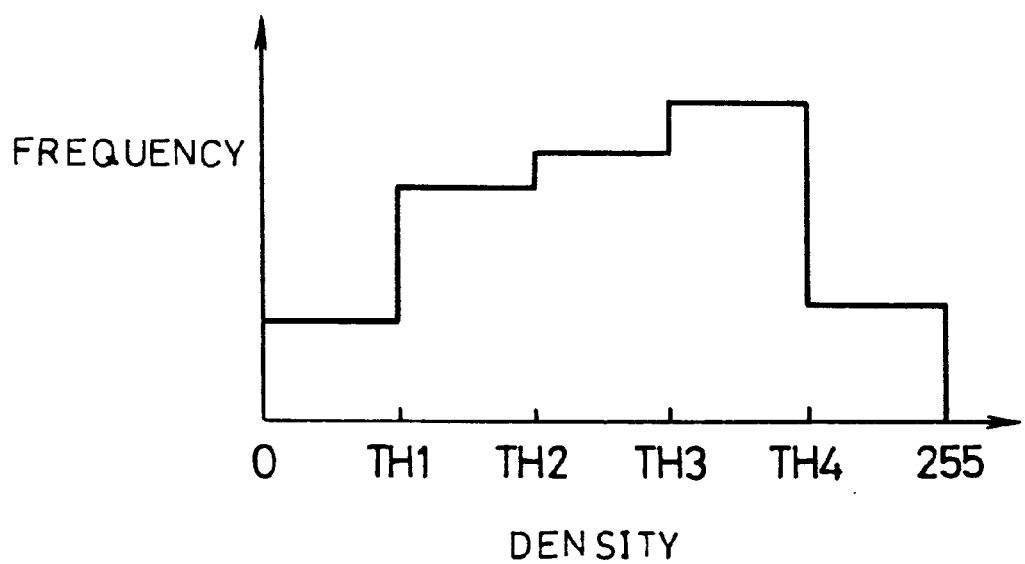
Figure 5A:
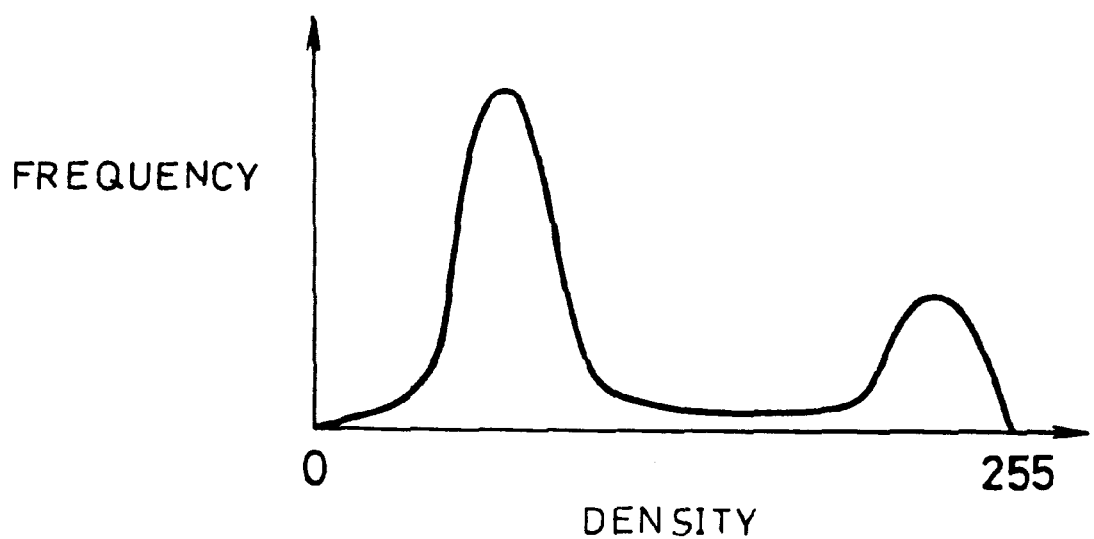
FIGS. 5(a)(b) are density histograms of a character document in which a background region is not in white such as newspaper, etc.
Figure 5B:
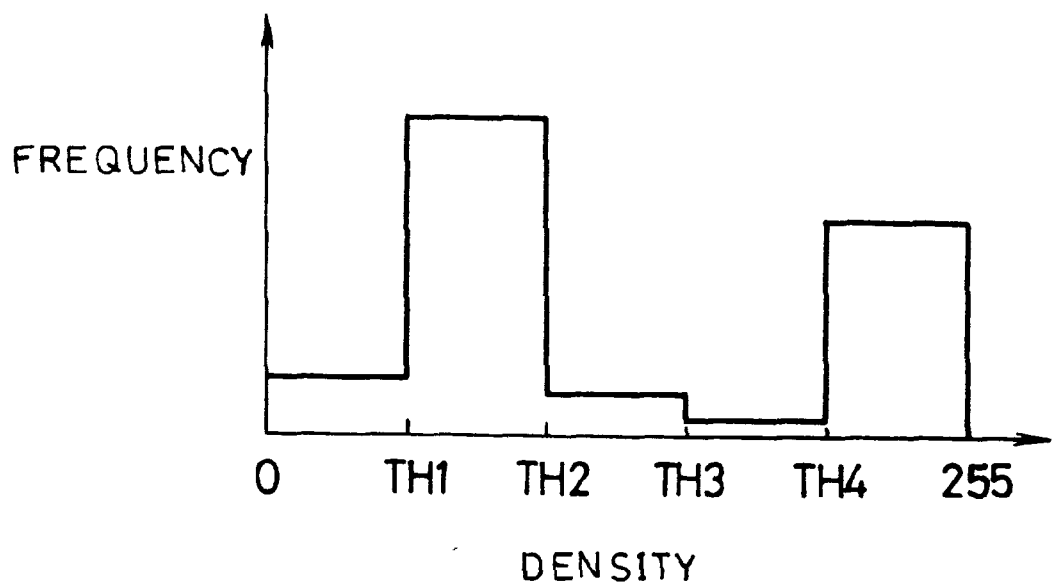

Next, the density histogram to be prepared based on the density histogram adopted in the feature data extracting circuit 3 will be explained in reference to FIG. 3(a) through FIG. 5(b). FIGS. 3(a) and 3(b) show the density histogram of a character document in which the background region is in white, and the character region is in black. FIGS. 4(a) and 4(b) show the density histogram of a photographic document. FIGS. 5(a) and 5(b) show the density histogram of a character document in which the background region is not in white, such as newspaper, etc.

As shown in FIG. 3(a), FIG. 4(a) and FIG. 5(a), in the density histograms, the x-axis indicates the image signal level (density), and the y-axis indicates the frequency at each level of the density, so as to show the features of the image of one line. Here, the numeral "1" represents the density value of the brightest level, and the numeral "255" represents the density value of the darkest level.

However, in the state shown in FIG. 3(a), FIG. 4(a) and FIG. 5(a), as a large amount of information exist, it takes time to process the information based on the density histogram in the density correction table selecting circuit 4. As a solution to the described problem, it is necessary to prepare a density histogram corresponding to the reduced amount of information while maintaining the information indicative of the image characteristics by applying the following process to the image signals of one line to simply the process.

The process of preparing the density histogram corresponding to the reduced amount of information will be explained.

First, as shown in FIG. 3(b), FIG. 4(b) and FIG. 5(b), threshold values TH1, TH2, TH3 and TH4 are set so as to correspond to respective density values step-by-step. Specifically, the TH1, TH2, TH3 and TH4 are set to the density values of 50, 100, 150 and 200 respectively in the present embodiment. Needless to mention, the threshold values of the present invention are not limited to the above, and the number of the threshold values is not limited to four, and may be selected as desired.

Next, by comparing the image signals obtained by reading the document with respect to the threshold values, to which of the ranges of from 0 to TH1, from TH1 to TH2, from TH2 to TH3, from TH3 to TH4, and from TH4 to 255, the image signal belongs is identified. Then, numbers of pixels in each density range are accumulated based on the result of identification.

Next, with respect to the accumulated number of pixels, the threshold value is selected to be 7-level, and by comparing the number of pixels with these threshold values for each density range, the number of pixels for each density range can be converted into 3-bit signals (0 through 7). For the threshold value of the number of pixels in each density range is not limited to 7, and can be set as desired.

The density histogram corresponding to the reduced amount of information prepared by the described process shows a density distribution having two peaks in which the brightest portion (at the density value in a vicinity of 0) and the darkest portion (at the density value in a vicinity of 255) have large frequencies as shown in FIG. 3(b), for example, in the case of the character document in which a great difference in density exists between the character region and the background region, i.e., the black character is written in the white background, as shown in FIG. 3(a).

As shown in FIG. 4(a), in the case of the photographic document including a large area of the intermediate tone which shows a smooth change in density between the brightest portion and the darkest portion has a large frequency, as shown in FIG. 4(b), the density distribution approximately has one peak as compared to the character document shown in FIG. 3(b).

As shown in FIG. 5(a), in the case of a character document such as newspaper, a document in which a background is in green, blue, yellow, etc., as shown in FIG. 5(b), has a greater difference in density between the character region and the background region than that of the photographic document of shown in FIG. 4(b). In contrast, the character document shown in FIG. 5(b) does not show a difference in density as large as that of the character document shown in FIG. 3(b). Specifically, documents like newspaper show such density distribution that the frequency corresponding to the background region is deviated to the intermediate tone side than the brightest tone as the density of the background region is lower than the character region shown in FIG. 3(b).

As described, the feature data extraction circuit 3 outputs density histogram information for preparing a density histogram corresponding to a reduced amount of information while maintaining features of the image to the density correction table selecting circuit 4 as the feature data of the document extracted from image signals.

Here, the density correction table to be adopted in the density correcting circuit 5 will be explained before explaining the density correction table selecting circuit 4.

First, the density correction table is provided for correcting the density of image signals from the input terminal 1. Therefore, in order to perform a density correction for attaining an improved quality of the recorded image, it is required to adopt the density correction table suited for respective images in consideration of features of each document.

Figure 8:
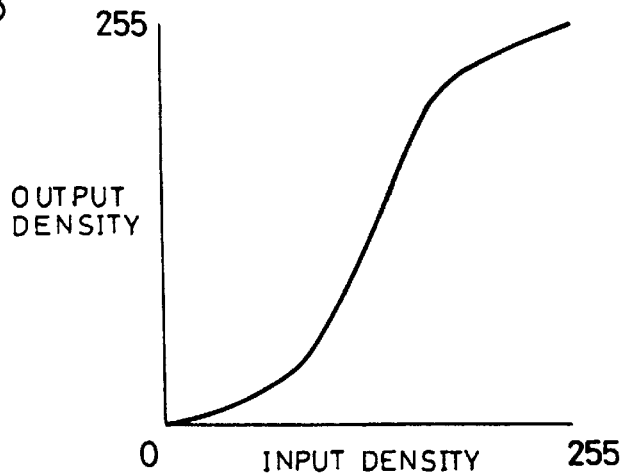
FIG. 8 is a graph showing a density correction table adopted in the density correcting circuit of the image processing apparatus of FIG. 1.
Figure 9:
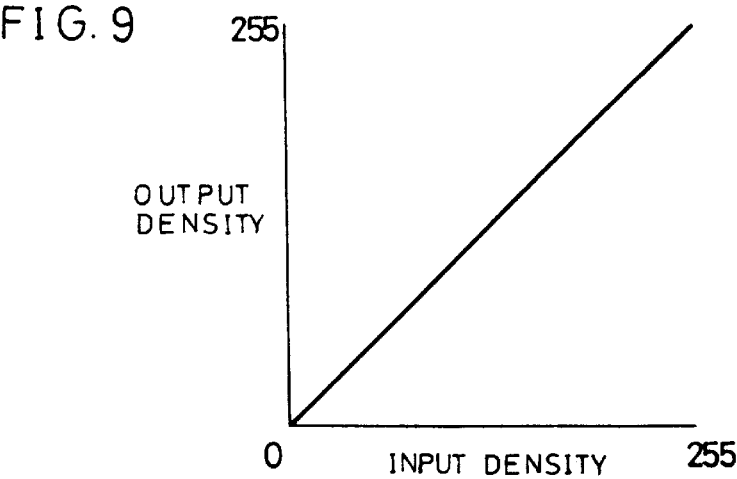
FIG. 9 is a graph showing a density correction table adopted in the density correcting circuit of the image processing apparatus of FIG. 1.
Figure 10:
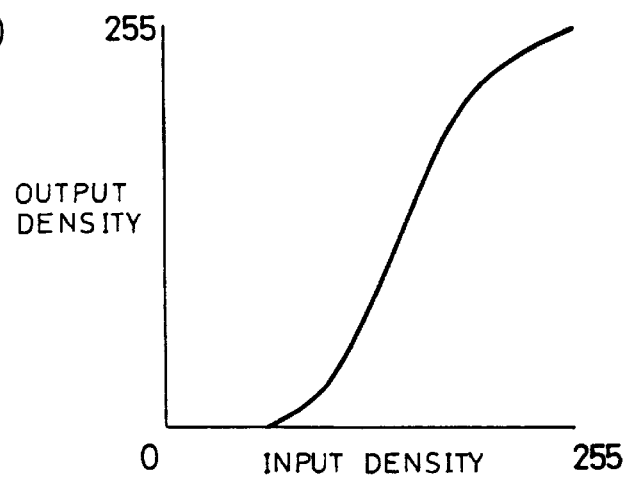
FIG. 10 is a graph showing a density correction table adopted in the density correcting circuit of the image processing apparatus of FIG. 1.

FIG. 8 through FIG. 10 show examples of such density correction tables prepared in consideration of characteristics of the document.

FIG. 8 shows the content in the density correction table in a graph for attaining an improved quality of the recorded image of the character document shown by the density histogram shown in FIG. 3(b). Specifically, in the case of the character document in which black characters are written in the white background, the density correction table is prepared such that the density of the bright portion is low and the density of the dark portion is high. According to the density correction table, by converting the density of an image signal so as to increase a contrast between the character region and the background region, i.e., by converting the input density into an appropriate output density, a clear recorded image can be obtained for the character document.

FIG. 9 shows the content in the density correction table in a graph for attaining an improved quality of the recorded image of the photographic document shown by the density histogram in FIG. 4(b). Specifically, in the case of the photographic document, the density correction table is prepared such that the respective densities of the bright portion and the dark portion are converted in the same ratio. According to the described density correction table, by converting the input density into an appropriate output density by emphasizing the density of the portion of the intermediate tone in the image, a clear recorded image can be obtained for the photographic document.

FIG. 10 shows the content of the density correction table in a graph for attaining an improved quality of the recorded image of a document (color background document) such as newspaper, etc., in which the background is colored (other than white) shown by the density histogram in FIG. 5(b). Specifically, in the case of the color background document in which the document is in color other than white, the density correction table is prepared such that the density conversion is not applied in an input density range from the brightest portion to a portion of a predetermined density value, and the density conversion is applied in an input density range from the portion of the predetermined density value to the darkest portion, and that the density on the side of the predetermined density value is small, and the density of the dark portion is large. According to this density correction table, by converting the density of the bright portion to be slightly deviated to the dark portion side compared with the density correction table shown in FIG. 8, a clear recorded image is obtained with respect to the document like newspaper, etc.

Next, the density correction table selecting circuit 4 will be explained in reference to FIG. 6 and FIGS. 7(a) and (b).

Figure 6:
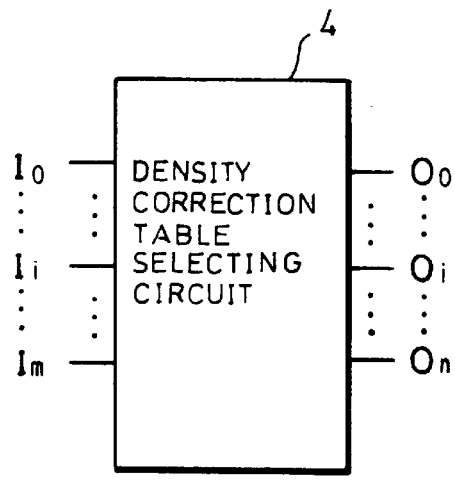
FIG. 6 is a diagram schematically showing a density correction table selecting circuit provided in the image processing apparatus of FIG. 1.

The structure of the density correction table selecting circuit 4 is shown in FIG. 6, wherein number of input bits m=4, and the number of output bits n=2. Namely, the input layer has five input values $I_0$, $I_1$, $I_2$, $I_3$, and $I_4$, and the output layer has three output values $O_0$, $O_1$ and $O_2$.

In the density histogram prepared based on the density histogram information of the current line of the image signal, the frequencies in the density value ranges of from 0 to TH1, from TH2 to TH3, from TH3 to TH4, and from TH4 to 255 are respectively denoted as $N_0(0)$, $N_0(1)$, $N_0(2)$, $N_0(3)$, and $N_0(4)$.

The density correction table selecting circuit 4 has five 3-bit input values for the histogram frequencies $N_0(0)$, $N_0(1)$, $N_0(2)$, $N_0(3)$, and $N_0(4)$ of the density histogram information (feature data) obtained from the feature data extracting circuit 3, which are denoted as $I_0$, $I_1$, $I_2$, $I_3$, and $I_4$ respectively in FIG. 6.

To correct the density of an image signal, output values of the density correction table selecting circuit 4 are set to 2-bit values. Specifically, an output value indicating that the density conversion based on the density correction table shown in FIG. 8 is suited is denoted as $O_0$ in FIG. 6, an output value indicating that the density conversion based on the density correction table shown in FIG. 9 is suited is denoted as $O_1$ in FIG. 6, and an output value indicating that the density conversion based on the density correction table shown in FIG. 10 is suited is denoted as $O_2$ in FIG. 6.

Here, the number of bits of input to the density correction table selecting circuit 4 is not particularly limited, and can be set as desired in consideration of the following. By increasing the number of bits of input values, an improved determination precision can be achieved; however, the processing speed is lowered, and a cost is increased.

Figure 7:
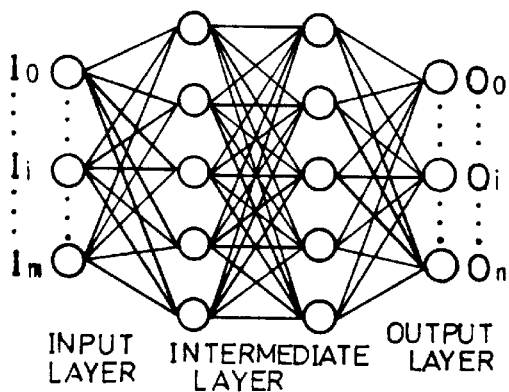
FIGS. 7(a) (b) are explanatory views showing a neural circuit network adopted in the density correction table selecting circuit of FIG. 6.
Figure 7:
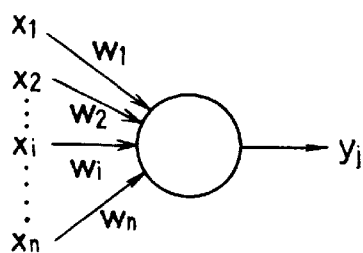

For the density correction table selecting circuit 4, a two-dimensional look up table in which input-output characteristics are determined beforehand by the neural circuit network, or the neural circuit network itself is adopted. FIG. 7(*a*) shows a 4-layer perceptrom, wherein number of input bits m=4, and the number of output bits n=2 as an example of the neural circuit network.

In the input layer, the histogram frequencies $N_0(0)$, $N_0(2)$, $N_0(3)$, and $N_0(4)$ normalized to 0~1 are inputted to $I_0$, $I_2$, $I_3$ and $I_4$ respectively.

In the output layer, $O_0$ (indicating the likelihood of the character document, $O_1$ indicating the likelihood of the photographic document, and $O_2$ indicating the likelihood of the color background document such as newspaper, etc., are outputted. Namely, in the case of correcting the density of an image based on the density correction table, $O_0$ indicating that the density correction table for the character document shown in FIG. 8 is suited, $O_1$ indicating that the density correction table corresponding to the photographic document shown in FIG. 9 is suited, and $O_2$ indicating that the density correction table corresponding to the color background document shown in FIG. 10 is suited are outputted from the output layer.

Each input layer is connected to inputs of all the neural elements of the intermediate layer, and an output of each intermediate layer is connected to inputs of all the neural elements of the output layer.

As shown in FIG. 7(*b*), each neural element is an element of plural inputs and a single output. Each neural element performs addition and multiplication arithmetic of the formula (1) wherein an input value of each neural element is denoted as $x_i$ and each weighted factor is denoted as $w_{ij}$. Further, each neural element outputs $y_j$ using the result $X_j$ of the addition and multiplication arithmetic as an input of a sigmoid function of the formula (2).

$$X_j = \sum_{i=1}^{n} w_{ij} \times x_i \quad (1)$$

$$y_j = f(X_j) = \frac{1}{1 + \exp(-X_j)} \quad (2)$$

In the case of adopting the neural circuit network which learned well beforehand, when inputting the histogram frequencies $N_0(0)$, $N_0(1)$, $N_0(2)$, $N_0(3)$, and $N_0(4)$ obtained as density histogram information (feature data) of the character document to the input layer, $O_0$ approximated to "1", $O_1$ approximated to "0", and $O_2$ approximated to "0" are outputted from the output layer. On the other hand, when histogram frequencies $N_0(0)$, $N_0(1)$, $N_0(2)$, $N_0(3)$ and $N_0(4)$ obtained as density histogram information (feature data of the photographic document) are inputted to the input layer, $O_0$, $O_1$, and $O_2$ respectively approximated to 0, 1 and 0 are outputted from the output layer. Further, when histogram frequencies $N_0(0)$ $N_0(1)$, $N_0(2)$, $N_0(3)$, and $N_0(4)$ obtained as density histogram information (feature data) of the color background document such as newspaper, etc., are inputted to the input layer, $O_0$, $O_1$, and $O_2$ approximated to 0, 0 and 1 respectively are outputted from the output layer.

In the neural circuit network for use in determining input-output characteristics of the two-dimensional look-up table, 8-bit neural elements are adopted for respective input and output layers. In the case of adopting the neural circuit network itself as the density correction table selecting circuit 4, a number of bits of each neural element of the input/output layers corresponds to a number of bits of each input/output of the density correction table selecting circuit 4 shown in FIG. 6.

The type of the neural circuit network is not limited to that shown in FIG. 7(*a*). Namely, the number of the intermediate layers of the neural circuit network circuit, and the number of the neural elements of the intermediate layer are set as desired, and other types of neural circuit network circuit may be adopted.

As described, the density correction table selecting circuit 4 outputs a value obtained based on the two-dimensional look-up table in which input-output characteristics are determined beforehand by the neural circuit network, or based on the neural circuit network itself to the density correcting circuit 5 as a selection signal for selecting the density correction table in the density correcting circuit 5.

Here, an example process of correcting the density in the density correcting circuit 5 based on the selection signal to be outputted from the density correction table selecting circuit 4 will be explained.

The density correcting circuit 5 selects the density correction table corresponding to the character document shown in FIG. 8 to correct the density under the following conditions:

The respective selection signals from the density correction table selecting circuit 4 are set such that the output value $O_0$ representing the likelihood of the character document is larger than the predetermined value, while the output value $O_1$, representing the likelihood of the photographic document and the output value $O_2$ representing the likelihood of the color background document such as newspaper, etc., are smaller than the respective predetermined values.

The density correcting circuit 5 selects the density correction table corresponding to the photographic document shown in FIG. 9 to correct the density under the following conditions:

The respective selection signals from the density correction table selecting circuit 4 are set such that the output value $O_1$ representing the likelihood of the photographic document is larger than the predetermined value, while the output value $O_0$ representing the likelihood of the character document and the output value $O_2$ representing the likelihood of the color background document such as newspaper, etc., are smaller than the respective predetermined values.

The density correcting circuit 5 selects the density correction table corresponding to the color background document such as newspaper, etc., shown in FIG. 10 to correct the density under the following conditions:

The respective selection signals from the density correction table selecting circuit 4 are set such that the output value $O_2$ representing the likelihood of the color background document such as newspaper is larger than the predetermined value, while the output value $O_0$ representing the likelihood of the character document and the output value $O_1$ representing the likelihood of the photographic document are smaller than respective predetermined values.

Figure 11:
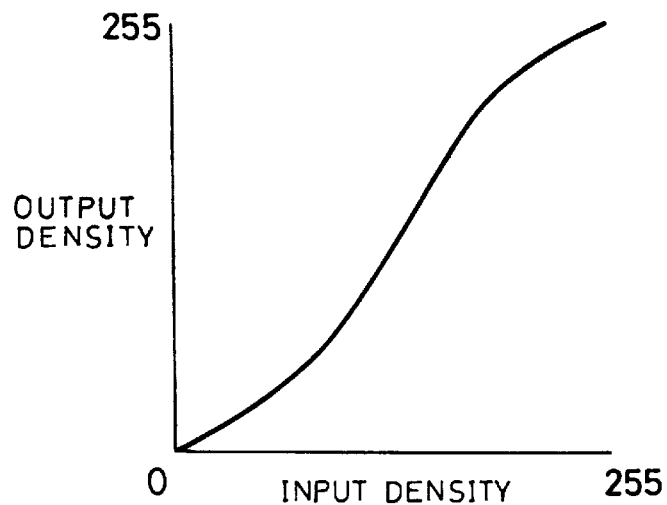
FIG. 11 is a graph showing a density correction table adopted in the density correcting circuit of the image processing apparatus of FIG. 1.
Figure 12:
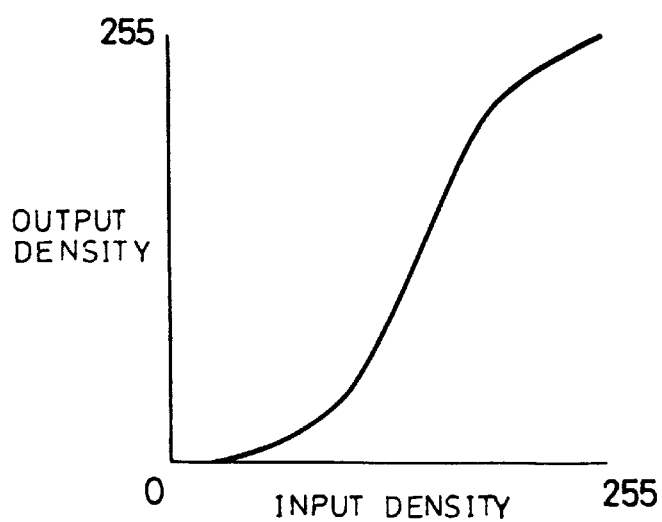
FIG. 12 is a graph showing a density correction table adopted in the density correcting circuit of the image processing apparatus of FIG. 1.

The density correcting circuit 5 is further arranged such that when none of the output values $O_0$, $O_1$ and $O_2$ i.e., selection signals from the density correction table selecting circuit 4 are greater than the respective predetermined values, the density is corrected based on the density correction tables shown in FIG. 11 and FIG. 12.

For example, in the case where the density correcting circuit 5 cannot identify whether the document subjected to the density correction is a character document or a photographic document based on a selection signal from the density correction table selecting circuit 4, the density is corrected based on the density correction table shown in FIG. 11 that is prepared in consideration of the density correction tables shown in FIG. 8 and FIG. 9. Similarly, in the case where the density correcting circuit 5 cannot identify whether the document subjected to the density correction is a photographic document or a color background document such as newspaper, etc., based on a selection signal from the density correction table selecting circuit 4, the density is corrected based on the density correction table shown in FIG. 12 that is prepared in consideration of the density correction tables shown in FIG. 9 and FIG. 10.

The density correcting circuit 5 may be arranged so as to include various types of density correction tables beforehand that are prepared in consideration of the density correction tables shown in FIG. 8, FIG. 9 and FIG. 10 like the density correction tables shown in FIG. 11 and FIG. 12, and select a suitable density correction table based on the output value from the density correction table selecting circuit 4.

According to the described arrangement, a density correction table for use in correcting the density of an image signal is selected in accordance with the density characteristics of the document. Thus, the density of the image signal can be corrected with high precision in accordance with the density characteristics of the document.

Moreover, since the feature of the document is recognized based on the image identification information identified by the density correction table selecting circuit 4 composed of the neural circuit network, the need of recognizing various parameter representing features of the document multi-dimensionally is eliminated, and a multi-dimensional image can be identified with high precision relatively with ease. As a result, the density correction table reflecting the fine features of the document such as density characteristics of the image, etc., can be selected, thereby permitting the density of the image signal to be corrected with high precision.

In the above-explanation, the density correction is applied based on the density correction table selected in accordance with the feature data of the image signals for each line. However, in the case of extracting the feature data of the document based on the image signals, the need of extracting the image signal per line is eliminated, and the feature data may be extracted from the image signal of successive plural lines.

However, in the case of performing the density correction based on the feature data extracted from the image signals, only with the given feature data of one line, the problem that the feature of the entire document and the feature of the line do not match may occur. Thus, if the density of the image signal is corrected without correcting a recognition error of the features of the document, an image quality in texture of a recorded image may be lowered.

Here, when the density histogram is prepared based on the image signals for one line, and the features of the document are identified, by correcting the density in consideration of lines around the current line corresponding to the image signals subjected to the density correction, a recognition error of the features of the document can be eliminated, thereby applying a desirable density correction to the image signals.

An image processing apparatus in which the density correction is applied in the described manner in consideration of the density correction applied to lines around the line corresponding to image signals currently subjected to the density correction will be explained in the below-presented second embodiment.

[Second Embodiment]

Another embodiment of the present invention will be explained. Here, members having the same function as those of the aforementioned embodiment will be designated by the same reference numerals, and thus the descriptions thereof shall be omitted here.

Figure 13:
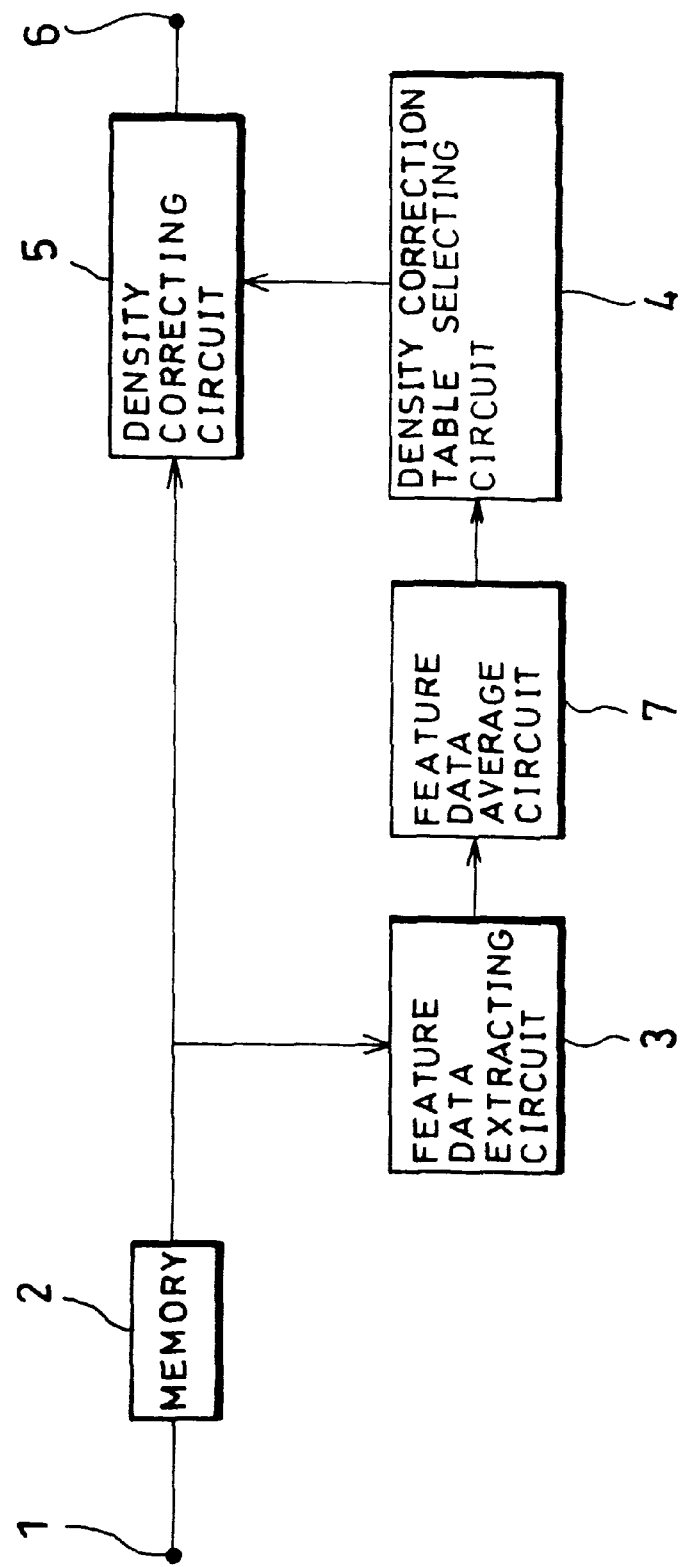
FIG. 13 is a block diagram schematically showing the structure of an image processing apparatus in accordance with another embodiment of the present invention.

As shown in FIG. 13, the image processing apparatus in accordance with the present embodiment includes a feature data average circuit 7 (feature data average means). The feature data average circuit 7 is provided between the feature data extracting circuit 3 and the density correction table selecting circuit 4.

The feature data average circuit 7 computes an average or a weighted average of the density histogram information of several lines before the current line corresponding to the image signal subjected to the density correction process, and outputs the result to the density correction table selecting circuit 4 as the feature data.

The process of obtaining the weighted average of the density histogram information in the feature data average circuit 7 will be explained.

In the density histogram prepared based on the density histogram information of the current line of the image signal, the respective frequencies in density value ranges of from 0 to TH1, from TH1 to TH2, from TH2 to TH3, from TH3 to TH4, and from TH4 to 255 are respectively denoted as $N_0(0)$, $N_0(1)$, $N_0(2)$, $N_0(3)$, and $N_0(4)$.

In the density histogram prepared based on the density histogram information of the lastly processed line, the respective frequencies in density value ranges of from 0 to TH1, from TH1 to TH2, from TH2 to TH3, from TH3 to TH4, and from TH4 to 255 are respectively denoted as $N_1(0)$, $N_1(1)$, $N_1(2)$, $N_1(3)$, and $N_1(4)$.

In the density histogram prepared based on the density histogram information of the second lastly processed line, the respective frequencies in density value ranges of from 0 to TH1, from TH1 to TH2, from TH2 to TH3, from TH3 to TH4, and from TH4 to 255 are respectively denoted as $N_2(0)$, $N_2(1)$, $N_2(2)$, $N_2(3)$, and $N_2(4)$.

In the density histogram additionally prepared based on the density histogram information (feature data), the respective frequencies in density value ranges of from 0 to TH1, from TH1 to TH2, from TH2 to TH3, from TH3 to TH4, and from TH4 to 255 are respectively denoted as N(0), N(1), N(2), N(3), and N(4). Then, respective frequencies N(n) are shown by the following formulae (3) through (7).

$$N(0) = \frac{4N_0(0) + 2N_1(0) + N_2(0)}{7} \quad (3)$$

$$N(1) = \frac{4N_0(1) + 2N_1(1) + N_2(1)}{7} \quad (4)$$

$$N(2) = \frac{4N_0(2) + 2N_1(2) + N_2(2)}{7} \quad (5)$$

$$N(3) = \frac{4N_0(3) + 2N_1(3) + N_2(3)}{7} \quad (6)$$

$$N(4) = \frac{4N_0(4) + 2N_1(4) + N_2(4)}{7} \quad (7)$$

Then, density histograms are prepared from respective frequencies obtained from the formulae (3) through (7), and are outputted to the density correction table selecting circuit 4 as averaged density histogram information.

In the above-defined formulae (3) through (7), the weight ratio is selected as follows: currently processed line: the lastly processed line: second lastly processed line=4:2:1. However, the weight ratio of the present invention is not limited to the above ratio, and the weight ratio can be set to any ratio as desired as long as the ratio permits the density histograms to be prepared so as to appropriately describe the respective features of the documents.

The following will explain the density correction process in which the density correction applied to the lines around the current line corresponding to the image signals subjected to the density correction is taken into consideration. In this case, the density correcting circuit 5 stores the information of the density correction table for use in correcting the density with respect to several lines before the current line corresponding to the image signal subjected to density correction, and selects the density correction table with respect to the current line in consideration of the stored content.

For example, when the density correction table corresponding to the photographic document shown in FIG. 9 is selected based on feature data corresponding to the current line, if the density correction table corresponding to the color background document such as newspaper, etc., shown in FIG. 10 was selected for the lastly processed line, the density correction table shown in FIG. 12 would be selected for the current line, that is prepared based on the density correction tables shown in FIG. 9 and FIG. 10.

Then, the density correcting circuit 5 selects the density correction table shown in FIG. 12, and applies a density correction to the current line based on the selected density correction table.

In the described manner, as the density correction table is selected in consideration of the contents of the density correction tables for several lines prior to the line corresponding to the image signals currently subjected to the density correction, the features of the document can be recognized with accuracy. As a result, a possible erroneous recognition of the document occurred when recognizing the features of the document based on the feature data of one line only can be eliminated, thereby avoiding an inappropriate density correction due to the wrong selection of the density correction table caused by a recognition error.

Thus, according to the image processing apparatus of the present embodiment, the density of the image signal can be corrected based on an appropriate density correction table, a deterioration of an image quality in texture of a recorded image that is apt to generate when correcting the density that differs line by line.

Another density correction process in which the density correction applied to image signals of lines around the current line is taken into consideration will be explained. The density correcting circuit 5 stores the feature data obtained by taking an average of the density histogram of several lines prior to the current line corresponding to the image signal subjected to the density correction by the feature data average circuit 7 and the information of the density correction table adopted in correcting the density with respect to above several lines prior to the current line. The density correcting circuit 5 selects a density correction table with respect to the current line in consideration of the stored information and the information of the density correction table selected based on the selection signal inputted based on the density histogram information (feature data) of the current line.

In this case, for the density correcting circuit 5, a neural circuit network shown in FIG. 7(a) is adopted, wherein the number of input bits m=5, and the number of output bits n=4.

In the input layer, the histogram frequencies $N_0(0)$, $N_0(2)$, $N_0(3)$, and $N_0(4)$ normalized to 0~1 are inputted to $I_0$, $I_2$, $I_3$, and $I_4$ respectively. An identification signal corresponding to the selection signal of the density correction table selected from the previous line is inputted to $I_5$.

In the case of applying the density correction to the target image signal based on the density correction table, $O_0$ indicating that the density correction table corresponding to the character document shown in FIG. 8 is suited, $O_1$ indicating that the density correction table shown in FIG. 11 is suited, $O_2$ indicating that the density correction table corresponding to the photographic document shown in FIG. 9 is suited, $O_3$ indicating that the density correction table shown in FIG. 12 is suited, $O_4$ indicating that the density correction table corresponding to the color background document shown in FIG. 10 is suited are outputted respectively from the output layer.

Each input layer is connected to inputs of all the neural elements of the intermediate layer, and an output of each intermediate layer is connected to inputs of all the neural elements of the output layer.

Figure 14:
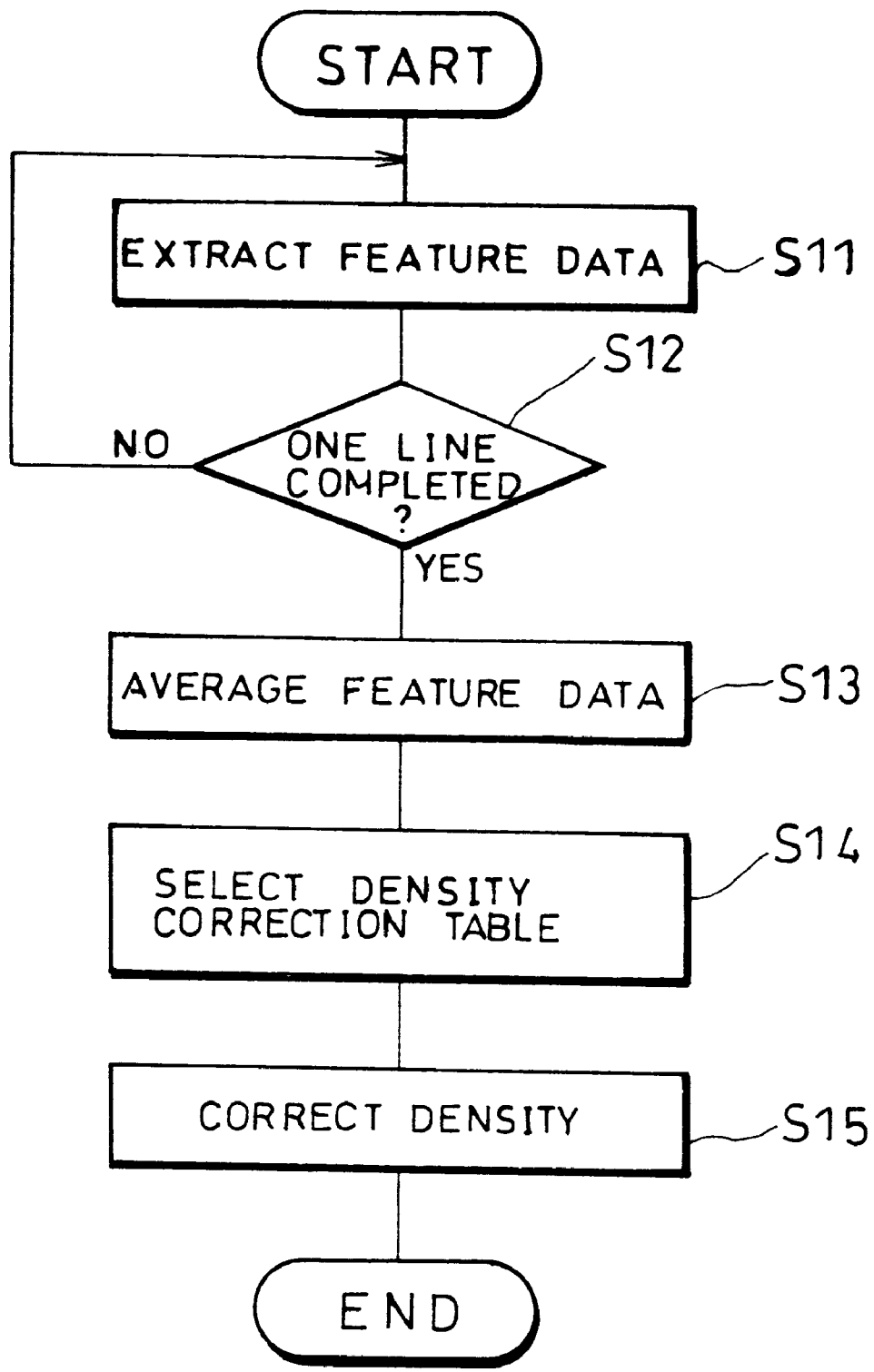
FIG. 14 is a flowchart showing a density correction process in the image processing apparatus shown in FIG. 13.

In the described arrangement, the process of correcting the density of the image signal in pursuit of an improved quality of a recorded image will be explained in reference to the flowchart of FIG. 14 and the block diagram of FIG. 13.

The image signals of the document for a plurality of lines read by the CCD image sensor are stored in the memory 2, and density histogram information (feature data) is extracted by the feature data extracting circuit 3 based on the stored image signal (S11).

Next, it is determined whether or not the density histogram information for one-line has been extracted (S12). Then, upon completing the extraction of the density histogram information for one-line, the feature data is averaged by the feature data average circuit 7 (S13). Namely, in the feature data average circuit 7, new feature data is prepared by taking an average of the feature data for several lines processed before the current line, and the feature data is outputted to the density correction table selecting circuit 4.

In the density correction table selecting circuit 4, a selection signal based on the averaged feature data is outputted to the density correcting circuit 5, and the density correction table that permits an optimal density correction at this stage to be selected by the density correcting circuit 5 (S14). Namely, the density correcting circuit 5 newly selects the density correction table by taking the average feature data and the density correction table for several lines before the current line into consideration.

Then, the density of the image signal is corrected based on the selected density correction table by the density correcting circuit 5 (S15).

According to the described arrangement, as the features of the document are recognized based on the density histogram information (information indicative of the density characteristics) for the image signals of several lines, the need of performing the preliminarily scanning operation for recognizing the features of the document required in the conventional method can be eliminated. As a result, compared with the case of selecting the density correction table according to the features of the document recognized by the preliminarily scanning, the time required for selecting the density correction table in accordance with the features of the document can be reduced, thereby permitting a high speed density correcting process.

Additionally, as the density correction is applied line by line, the density can be corrected appropriately even for such document that the features change abruptly within the sheet of the document. As a result, an optimal density correction table can be selected in accordance with respective features contained in each region of the sheet of the document.

Moreover, according to the arrangement of the present invention, in the case of correcting the density by extracting the feature data from the image signals of one line, the density histogram is prepared from the density histogram information (feature data) in consideration of the image signal of several lines prior to the current line, a recognition error of the image signal can be eliminated. As a result, a deterioration of the quality in texture of the recorded image due to the recognition error of the features of the document can be eliminated, thereby performing a desirable density correction by the density correction process.

[Third Embodiment]

The following descriptions will discuss another embodiment of the present invention.

Figure 15:
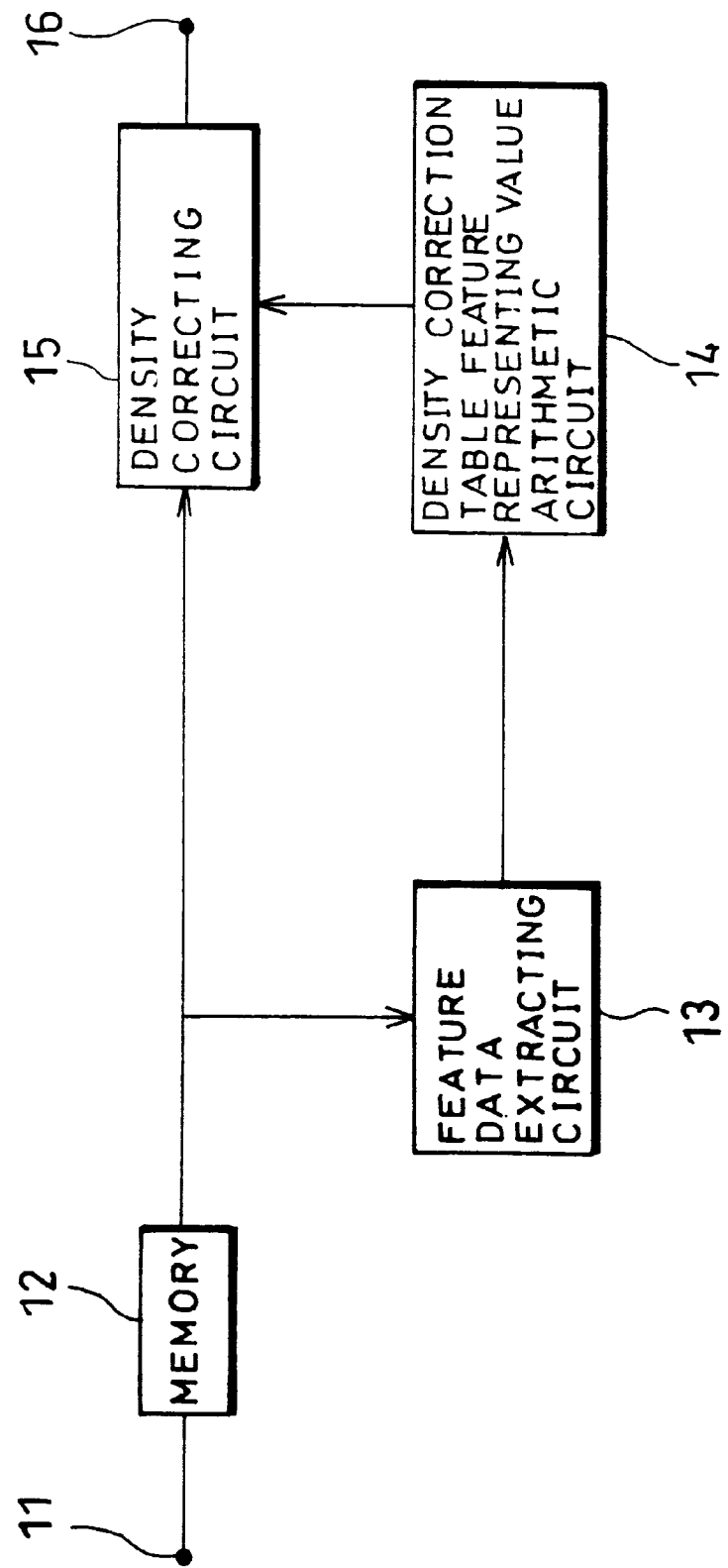
FIG. 15 is a block diagram schematically showing the structure of an image forming apparatus in accordance with still another embodiment of the present invention.

As shown in FIG. 15, the image processing apparatus in accordance with the present embodiment includes an input terminal 11, a memory 12 (memory means), a feature data extracting circuit 13 (feature data extraction means), a density correction table characteristic representing value arithmetic circuit 14 (characteristic representing value arithmetic means), a density correcting circuit 15 (density correction means), and an output terminal 16. Other than the density correction table characteristic representing value arithmetic circuit 14, the circuit of the present embodiment has the same function as that of the circuit of the first embodiment shown in FIG. 1, and thus the descriptions thereof shall be omitted here.

The density correction table characteristic representing value arithmetic circuit 14 computes the characteristics representing values of an optimal density correction table for each of the documents shown in FIG. 8 through FIG. 10 explained in the first embodiment based on the density histogram information (feature data) obtained by the feature data extracting circuit 3. Here, the characteristic representing value indicates a frequency value corresponding to a predetermined input density value from the density histogram information, which is a reference value in preparing the density correction table by the density correcting circuit 15 (to be described later).

Then, the density correction table characteristic representing value arithmetic circuit 14 outputs a computed characteristic representing value to the density correcting circuit 15.

In the density correcting circuit 15, a density correction table is prepared based on the characteristics representing value. The process of preparing the density correction table in the density correcting circuit 15 will be explained later in detail.

Figure 17:
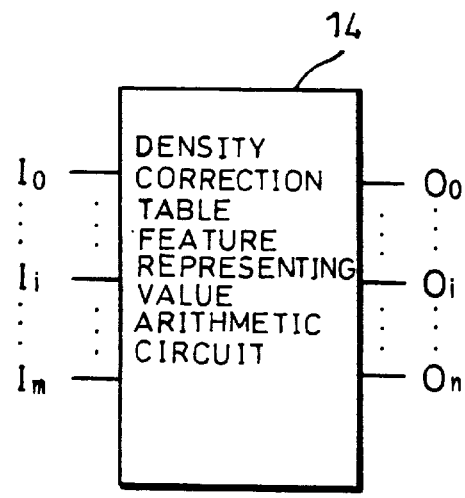
FIG. 17 is a diagram schematically showing a density correction table characteristic representing value arithmetic circuit provided in the image processing apparatus of FIG. 15.

The structure of the density correction table characteristic representing value arithmetic circuit 14, wherein the number of input bits m=4, and the number of output bits n=16 in reference to FIG. 17. The density correction table characteristic representing value arithmetic circuit 14 has five input 3-bit values of the histogram densities $N_0(0)$, $N_0(1)$, $N_0(2)$, $N_0(3)$ and $N_0(4)$ of the density histogram information (feature data) obtained from the feature data extracting circuit 13, which are denoted as $I_0$, $I_1$, $I_2$, $I_3$, and $I_4$ respectively in FIG. 17.

For the output values of the density correction table characteristic representing value arithmetic circuit 14, an output density value in response to the input density value 0 is 8-bit denoted as $O_0$ in the figure, an output density value in response to the input density value 16 is 8-bit denoted as $O_1$ in the figure, an output density value in response to the input density value 32 is 8-bit denoted as $O_2$ in the figure, an output density value in response to the input density value 48 is 8-bit denoted as $O_3$ in the figure, an output density value in response to the input density value 64 is 8-bit denoted as $O_4$ in the figure, an output density value in response to the input density value 80 is 8-bit denoted as $O_5$ in the figure, an output density value in response to the input density value 96 is 8-bit denoted as $O_6$ in the figure, an output density value in response to the input density value 112 is 8-bit denoted as $O_7$ in the figure, an output density value in response to the input density value 128 is 8-bit denoted as $O_8$ in the figure, an output density value in response to the input density value 144 is 8-bit denoted as $O_9$ in the figure, an output density value in response to the input density value 160 is 8-bit denoted as $O_{10}$ in the figure, an output density value in response to the input density value 176 is 8-bit denoted as $O_{11}$ in the figure, an output density value in response to the input density value 192 is 8-bit denoted as $O_{12}$ in the figure, an output density value in response to the input density value 208 is 8-bit denoted as $O_{13}$ in the figure, an output density value in response to the input density value 224 is 8-bit denoted as $O_{14}$ in the figure, an output density value in response to the input density value 240 is 8-bit denoted as $O_{15}$ in the figure, an output density value in response to the input density value 256 is 8-bit denoted as $O_{16}$ in the figure, etc.

For the density correction table characteristic representing value arithmetic circuit 14, a two-dimensional look up table in which input-output characteristics are determined beforehand by the neural circuit network, or the neural circuit network itself is adopted. For the neural circuit network, for example, a 4-layer perceptron, wherein m=4, and n=16 shown in FIG. 7(a) may be adopted.

In the input layer, the histogram frequencies $N_0(0)$, $N_0(1)$, $N_0(2)$, $N_0(3)$ and $N_0(4)$ respectively normalized to 0~1 are inputted to $I_0$, $I_1$, $I_2$, $I_3$, and $I_4$ respectively.

The output density values from the output layer are normalized to 0~1. Specifically, the normalized density output value with respect to the input density value 0 is denoted as $O_0$, the normalized density output value with respect to the input density value 16 is denoted as $O_1$, the normalized density output value with respect to the input density value 32 is denoted as $O_2$, the normalized density output value with respect to the input density value 48 is denoted as $O_3$, the normalized density output value with respect to the input density value 64 is denoted as $O_4$, the normalized density output value with respect to the input density value 80 is denoted as $O_5$, the normalized density output value with respect to the input density value 96 is denoted as $O_6$, the normalized density output value with respect to the input density value 112 is denoted as $O_7$, the normalized density output value with respect to the input density value 128 is denoted as $O_8$, the normalized density output value with respect to the input density value 144 is denoted as $O_9$, the normalized density output value with respect to the input density value 160 is denoted as $O_{10}$, the normalized density output value with respect to the input density value 176 is denoted as $O_{11}$, the normalized density output value with respect to the input density value 192 is denoted as $O_{12}$, the normalized density output value with respect to the input density value 208 is denoted as $O_{13}$, the normalized density output value with respect to the input density value 224 is denoted as $O_{14}$, the normalized density output value with respect to the input density value 240 is denoted as $O_{15}$, and the normalized density output value with respect to the input density value 256 is denoted as $O_{16}$.

Each input layer is connected to inputs of all the neural elements of the intermediate layer, and an output of each intermediate layer is connected to inputs of all the neural elements of the output layer.

As shown in FIG. 7(b), each neural element is an element of plural inputs and single output. Each neural element performs a summing and multiplying operation of the formula (8). Further, each neural element outputs a value $y_j$ using the result $X_j$ of this operation as an input of a sigmoid function of the formula (9) wherein an input value of each neural element is denoted as $x_i$ and each weighed factor is denoted as $w_{ij}$.

$$X_j = \sum_{i=1}^{n} w_{ij} \times x_i \qquad (8)$$

$$y_j = f(X_j) = \frac{1}{1 + \exp(-X_j)} \qquad (9)$$

In the case of adopting the neural circuit network which is well learned beforehand, when inputting the histogram frequencies $N_0(0)$, $N_0(1)$, $N_0(2)$, $N_0(3)$, and $N_0(4)$ obtained as density histogram information (feature data of the character document) to the input layer, a characteristic value corresponding to the density correction table shown in FIG. 8 is outputted from the output layer, while when inputting the histogram frequencies $N_0(0)$, $N_0(1)$, $N_0(2)$, $N_0(3)$, and $N_0(4)$ obtained as density histogram information (feature data of the photographic document) to the input layer, a characteristic value corresponding to the density correction table shown in FIG. 9 is outputted from the output layer. On the other hand, when inputting the histogram frequencies $N_0(0)$ $N_0(1)$, $N_0(2)$, $N_0(3)$ and $N_0(4)$ obtained as density histogram information (feature data of the color background document) to the input layer, a characteristic value corresponding to the density correction table shown in FIG. 10 is outputted from the output layer.

In the neural circuit network for obtaining input-output characteristics of the two-dimensional look-up table, 8-bit neural elements are adopted for respective input-output layers. In the case of adopting the neural circuit network itself to the density correction table characteristic representing value arithmetic circuit 14, a number of bits of each neural element of an input/output layer corresponds to a number of bits of each input/output of the density correction table characteristic representing value arithmetic circuit 14 shown in FIG. 17.

The type of the neural circuit network is not limited to that shown in FIG. 7(a). Namely, the number of the intermediate layers of the neural circuit network, and the number of the neural elements of the intermediate layer are set as desired, and other types of neural circuit network may be adopted.

As described, the density correction table characteristic representing value arithmetic circuit 14 outputs a characteristic representing value of an image signal obtained by a two-dimensional look up table in which input-output characteristics are determined beforehand by the neural circuit network, or a characteristic representing value of an image signal obtained by the neural circuit network itself to the density correcting circuit 5 as a reference signal including the characteristic representing value for preparing the density correction table.

Here, an example of the density correction by the density correcting circuit 15 based on the characteristic representing value to be outputted from the density correction table characteristic representing value arithmetic circuit 14 will be explained.

Figure 18:
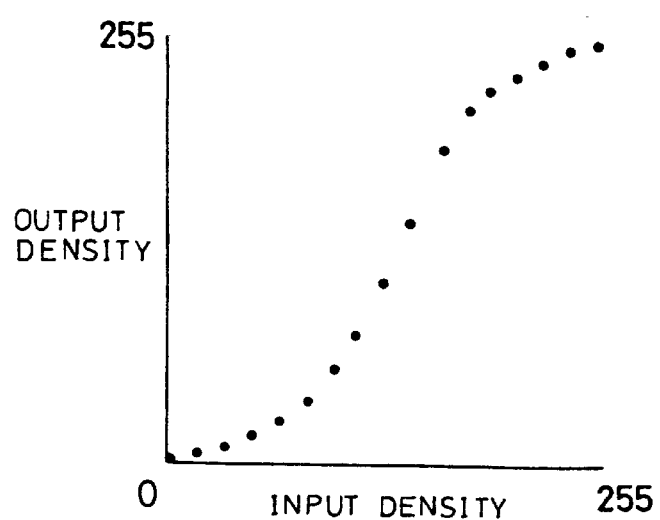
FIG. 18 is a graph showing a correlation between an input density and an output density in characteristic representing value to be outputted from the density correction table characteristic representing value arithmetic circuit shown in FIG. 17.

In the density correcting circuit 15, based on the characteristic representing value outputted from the density correction table characteristic representing value arithmetic circuit 14, 17 output representing values $O_0 \sim O_{16}$ of the output layer in the range of from 0 to 255 are plotted by a line interpolation, a spline interpolation, etc. as shown in FIG. 18. Then, the density correcting circuit 15 corrects the density of the image signal based on the density correction table obtained in the described manner.

Figure 16:
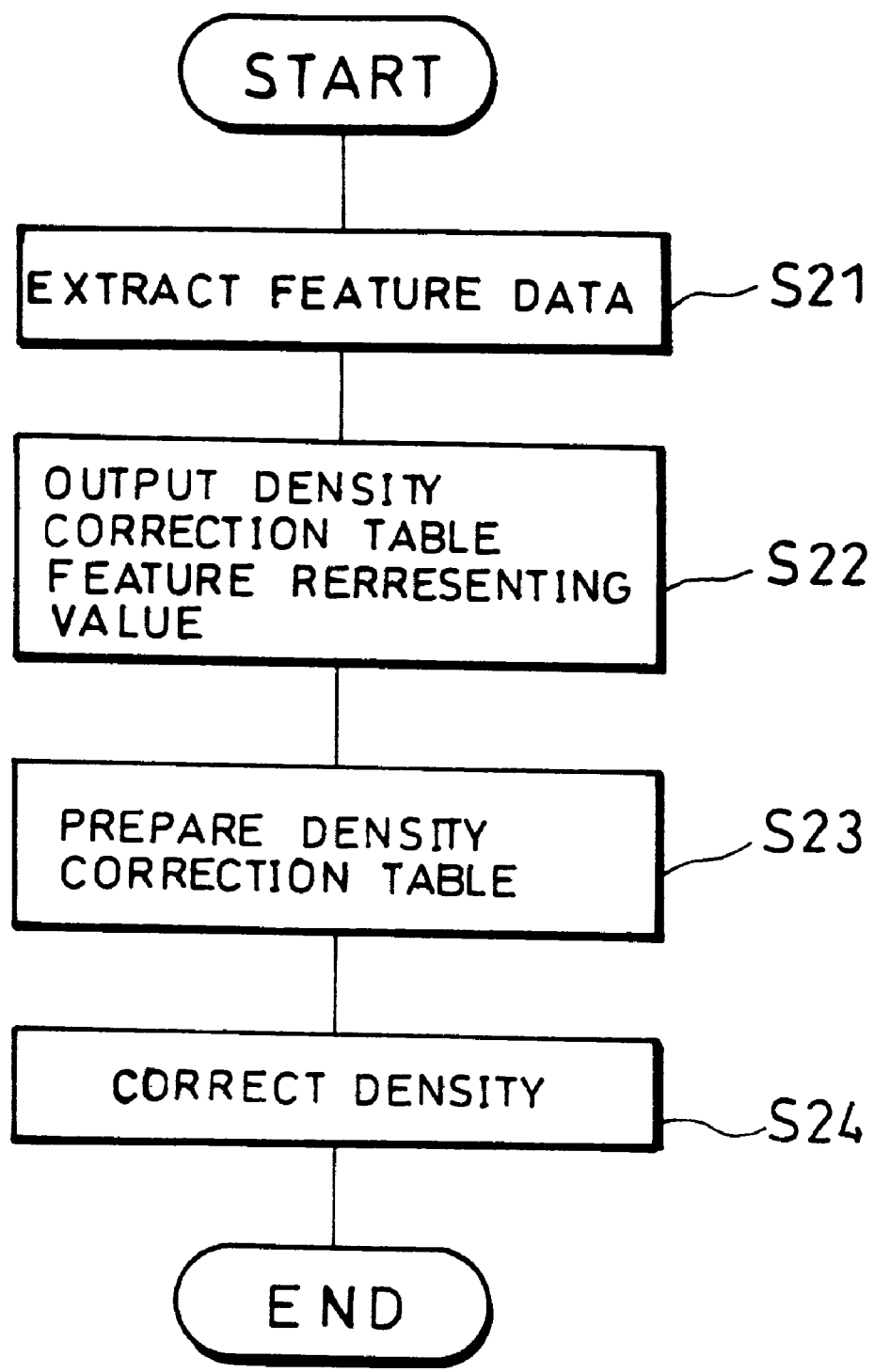
FIG. 16 is a flowchart showing a density correction process in the image processing apparatus shown in FIG. 15.

In the described arrangement, the process of correcting the density of an image signal in pursuit of an improved quality of the recorded image will be explained in reference to the flowchart of FIG. 16 and the block diagram of FIG. 15.

First, the image signals of the document for a plurality of lines read by means of a CCD image sensor are stored in the memory 12, and density histogram information (feature data) is extracted by the feature data extracting circuit 13 based on the stored image signal (S21).

Then, the extracted density histogram information is outputted to the density correction table characteristic representing value arithmetic circuit 14. In the density correction table characteristic representing value arithmetic circuit 14, the features of the document are determined, and are outputted to the density correcting circuit 15 as the characteristic representing value (S22).

In the density correcting circuit 15, the density correction table is prepared based on the characteristic representing value (S23), and a density correction process is applied to the image signal based on the density correction table (S24).

As described, the image processing apparatus in accordance with the present embodiment is arranged so as to prepare the density correction table based on the computed characteristic representing values of the image signals, and the density correction process is applied to the image signals based on the density correction table. As the described arrangement permits density correction tables in accordance with the characteristics of the image signals to be prepared, the density correction process can be applied to the image signal with an improved accuracy, thereby achieving an improved quality of the recorded image.

Furthermore, as the neural circuit network is adopted for the density correction table characteristic representing value arithmetic circuit 14, the characteristic representing value can be computed accurately at high speed with ease from the image signal without performing a complicated computation.

In the present embodiment, based on the feature data at every line of the image signal, characteristic representing value is computed, and the density correction table is prepared based on the characteristic representing value. In the case of extracting the feature data of the document based on the image signals, it is not necessarily to extract the image signals line by line, and the feature data may be extracted based on the image signals for successive several lines.

However, when correcting the density based on the feature data extracted from the image signal with respect to the feature data of one line, such problem that the feature of the entire document and the feature of the line do not match occur. If the density of the image signals is corrected without correcting a recognition error of the features of the document, the quality in texture of the recorded image may be lowered.

In the case of preparing the density histogram based on the image signals of one line to identify the features of the document, by applying the density correction process in consideration of lines around the line corresponding to the image signals currently subjected to density correction, a recognition error of the features of the document can be eliminated, thereby performing a desirable density correction process.

Explanations on the image processing apparatus in consideration of the density correcting process with respect to lines around the line corresponding to the image signals currently subjected to the density correction will be explained in the below-presented fourth embodiment.

[Fourth Embodiment]

Figure 19:
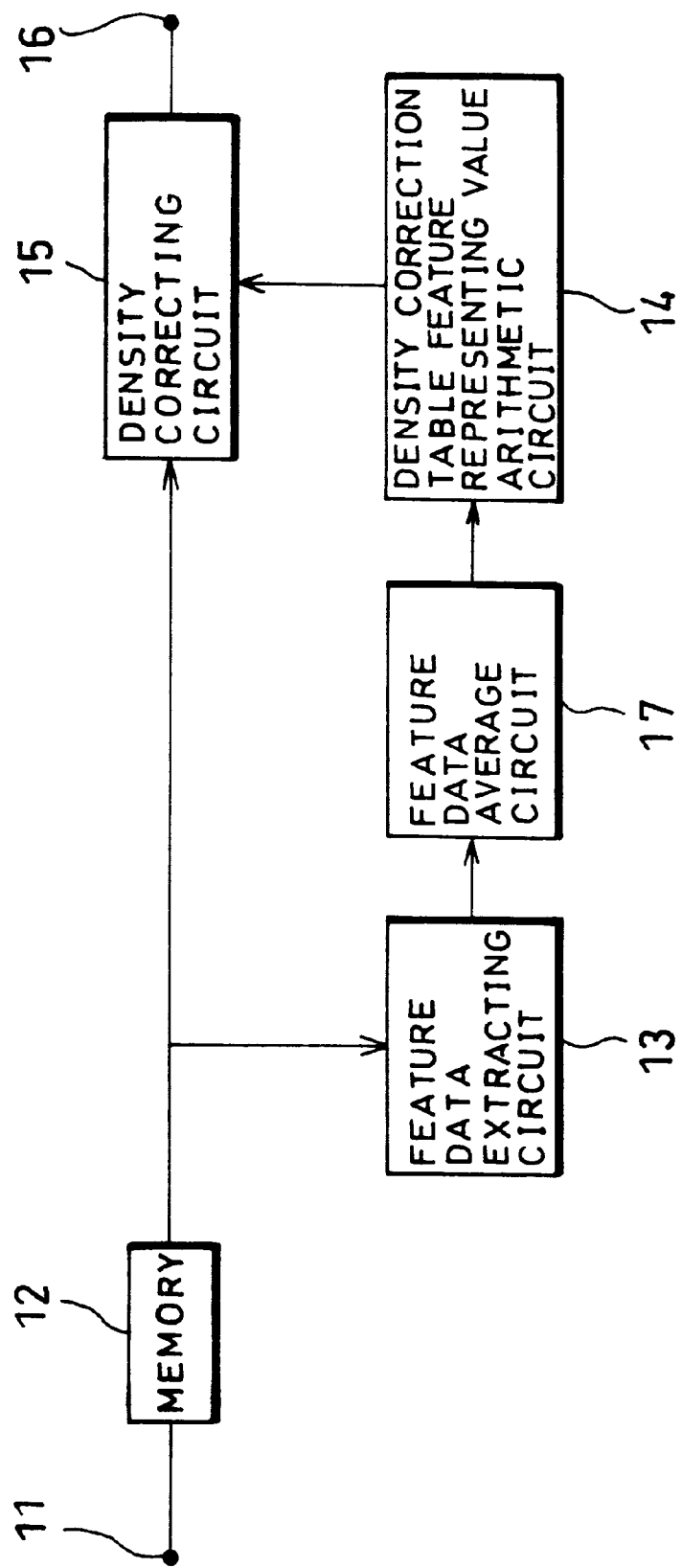
FIG. 19 is a block diagram schematically showing the structure of the image processing apparatus in accordance with still another embodiment of the present invention.
Figure 20:
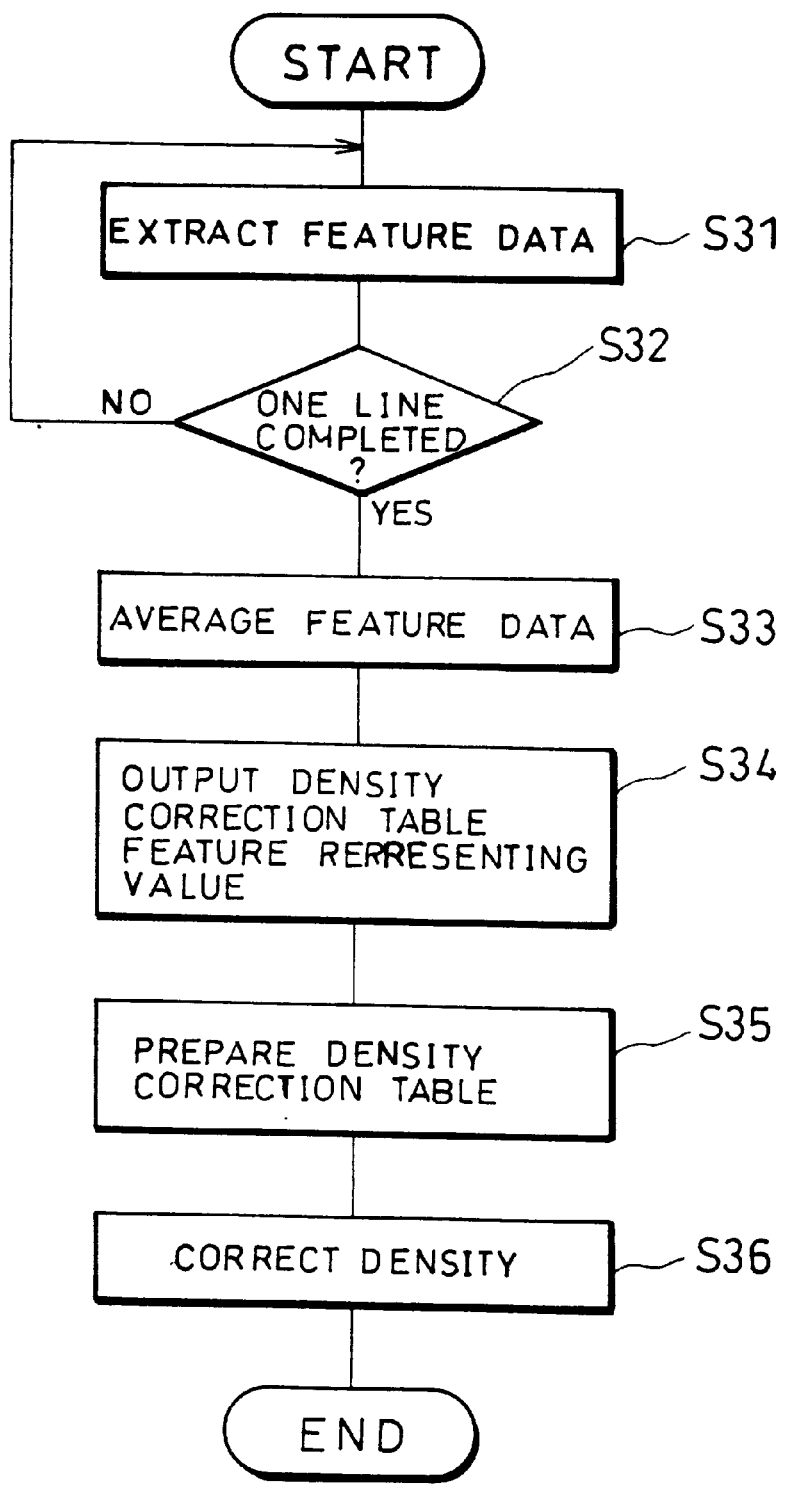
FIG. 20 is a flowchart showing a density correction process in the image processing apparatus of FIG. 19.

The following descriptions will discuss still another embodiment of the present invention in reference to FIG. 19 and FIG. 20. Here, members having the same function as those of the third embodiment will be designated by the same reference numerals, and thus the descriptions thereof shall be omitted here.

As shown in FIG. 19, the image processing apparatus in accordance with the present embodiment includes a feature data average circuit 17 (feature data average means). The feature data average circuit 17 is formed between the feature data extracting circuit 13 and the density correction table characteristic representing value arithmetic circuit 14.

The feature data average circuit 17 has the same function as the feature data average circuit 7 adopted in the second embodiment, and computes an average or a weighted average of the density histogram information for several lines before the current line corresponding to the image signals subjected to the density correction process, and outputs the result to the density correction table characteristic representing value arithmetic circuit 14 as the feature data.

The process of computing the weighted average of the density histogram information in the feature data average circuit 17 is the same as that of the second embodiment, and thus explanations thereof shall be omitted here.

The following will explain the case where the density correction process with respect to the lines around the line corresponding to the image signals currently subjected to the density correction process is taken into consideration. In this case, the density correcting circuit 15 stores the content of the density correction table used in correcting the density for several lines before the line corresponding to the image signals currently subjected to the density correction, and prepares a density correction table with respect to the current line taking the stored content into consideration.

For example, when preparing a density correction table corresponding to the photographic document shown in FIG. 8 based on the feature data corresponding to the current line, the density correcting circuit 15 prepares the density correction table as shown in FIG. 11 for the current line in consideration of the respective density correction tables shown in FIG. 8 and FIG. 10 if the density correction table for the color background document such as newspaper, etc., is prepared for the line lastly processed.

Then, the density correcting circuit 15 applies the density correction to the current line based on the density correction table shown in FIG. 11.

According to the described arrangement, as the density correction table is prepared in consideration of the content of the density correction table for several lines before the line currently subjected to the density correction, the features of the document can be recognized appropriately. As a result, a recognition error of the document which is apt to occur when recognizing the features of the document of based on only the feature data of one line can be prevented, thereby avoiding an inappropriate density correction based on an inappropriate density correction table caused by the recognition error.

As this permits the density correction of the image signal to be performed based on the appropriate selection of the density correction table, and a deterioration in texture quality of the recorded image that is apt to occur when performing a different density correction for each line can be prevented.

Another example of correcting the density of the image signal in consideration of the density correction applied to lines around the line corresponding to the image signals currently subjected to the density correction process will be explained. The density correcting circuit 15 stores the content of the density correction table used in applying the density correction process to several lines processed before the current line of the image signal, and prepares a density correction table for the current line in consideration of the stored content and the content of the density correction table prepared based on the characteristic representing value obtained from the density histogram (feature data of the current line).

In this case, for the density correcting circuit 15, a neural circuit network shown in FIG. 7(a) is used. Here, m=4, and n=16. The neural circuit network adopted in the present embodiment is the same as that of the third embodiment, and thus the descriptions thereof shall be omitted here.

According to the described arrangement, as the neural circuit network is used for recognizing the features of the document, various parameters required in preparing a density correction table can be set relatively with ease. As a result, the selection of the density correction table in accordance with the image characteristics can be performed accurately at high speed.

In the image processing apparatus having the described arrangement, the process of correction the density of the image signal in pursuit of an improved quality of the recorded image will be explained in reference to the flowchart of FIG. 20 and the block diagram of FIG. 19.

First, image signals of the document for a plurality of lines read by means of the CCD image sensor is stored in the memory 12, and the density histogram information (feature data) is extracted by the feature data extracting circuit 13 (S31).

Then, it is determined whether or not the extraction of the density histogram information for one line is completed (S32). Here, upon completing the extraction of the density histogram information for one line, the average of the feature data is taken by the feature data average circuit 17 (S33). Namely, the feature data average circuit 17 prepares new feature data by taking an average of the feature data for several lines lastly processed before the line currently subjected to the density correction, and outputs the feature data to the density correction table characteristic representing value arithmetic circuit 14.

Then, the density correction table characteristic representing value arithmetic circuit 14 computes a characteristic representing value based on the averaged feature data and the information of the density correction table for lastly processed several lines before the line currently subjected to the density correction, and outputs the characteristic representing value to the density correcting circuit 15 (S34).

Next, the density correcting circuit 15 prepares new density correction table based on the characteristic representing value (S35), and corrects the density of an image signal based on the density correction table (S36).

According to the described arrangement, as the features of the document is recognized based on the feature data of image signals for several lines, the need of a preliminarily scanning for recognizing the features of the document is eliminated. As this permits a time required for preparing the density correction table in accordance with the features of each document to be reduced compared with the case of preparing the density correction table in accordance with the features of the document recognized by the preliminarily scanning, thereby permitting a high speed density correction process.

Additionally, as the density correction is performed line by line, even when the features greatly change within one sheet of the document, the density correction can be applied desirably. As a result, an appropriate density correction table can be prepared in accordance with respective features in each region of a sheet of the document.

In the present embodiment, in the case of applying the density correction process by extracting the feature data from the image signals of one line, since the density histogram is prepared based on the density histogram information (feature data) in consideration of the image signals of several lines before the image signals of the current line, a recognition error of the image signal can be eliminated. As a result, deterioration in quality due to a change in texture of the recorded image caused by a recognition error of the features of the document can be eliminated, thereby permitting a desirable density correction process.

In the described preferred first through fourth embodiments, the feature data extracting circuit 3 and the feature data extracting circuit 13 are arranged so as to obtain the density histogram information (feature data) from image signals of one line; however, it may be also arranged so as to obtain the density histogram information with respect to the image signals of an arbitrary portion of one line.

In this case, as the image signals of a random part of a line is considered to be the feature data of the line, the need of processing the image signals of the entire line is eliminated, and a time required for extracting the feature data can be reduced. The described arrangement of extracting the feature data from a random part of the line permits the density correction to be desirably applied to a specific part of the document accurately at high speed.

In the second and fourth embodiments, when taking the weighted average of the density histogram information, for example, the ratio of the currently processed line: lastly processed line: second lastly processed line =4:2:1. However, as already mentioned, the present invention is not limited to this ratio. Here, it is preferable to set the ratio to become heavier in the following order: currently processed line > lastly processed line > second lastly processed line.

The above condition is preferable for the reason that the closer to the line currently subjected to the density correction is, the more preferable to have a larger weighted average. Namely, by taking the weighted average such that the weight is increased towards the current line, i.e., the line subjected to the density correction, the overall information corresponding to the lines surrounding the current line subjected to the density correction can be taken into consideration without losing the local information of the line subjected to the density correction, thereby preparing a still more desirable feature data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:

feature data extraction means for extracting feature data indicative of density characteristics of document based on image signals obtained by scanning the document;

image recognition means composed of a neural circuit network which is learned beforehand so as to recognize image characteristics of the document based on the feature data; and density correction means for correcting the density of the image signals in accordance with the image characteristics based on image recognition information from said image recognition means, wherein said feature data extraction means outputs information indicative of a density distribution of the document based on the image signals as the feature data, wherein said information indicative of the density distribution of the document is density histogram information, and further including means for reducing the density histogram information while maintaining the information indicative of the density distribution, wherein the density histogram information is reduced based on a plurality of threshold values being set in stages.

2. The image processing apparatus as set forth in claim 1, wherein:

said density correction means includes plural kinds of density correction tables for converting density values of the image signals into corrected density values in accordance with the image characteristics, a density correction table in accordance with image characteristics is selected among said plural kinds of density correction tables based on the image recognition information, and the density of the image signals is corrected based on the density correction table.

3. The image processing apparatus as set forth in claim 2, wherein:

said image recognition means outputs a selection signal to said density correction means, the selection signal being used in selecting the density correction table in accordance with the image characteristics of the document recognized based on inputted feature data among said plural kinds of density correction tables in said density correction means.

4. The image processing apparatus as set forth in claim 2, wherein:

when the document is a character document in which black characters are written in white background, the density correction table is prepared such that a bright portion has low density, while a dark portion has high density.

5. The image processing apparatus as set forth in claim 2, wherein:

when the document is a photographic document, the density correction table is prepared such that respective densities of a bright portion and a dark portion are converted in a same ratio as density values of the image signal.

6. The image processing apparatus as set forth in claim 2, wherein:

when the document is a color background document which is in color other than white, the density correction table is prepared such that a density conversion is not applied in a predetermined input density range from a brightest portion to a portion of a predetermined density, while a density conversion is applied in a predetermined input density range from the portion of the predetermined density to the darkest portion, and that the portion of the predetermined density has a small density, while the dark portion has high density.

7. The image processing apparatus as set forth in claim 2, wherein:

a density correction table in accordance with image characteristics is selected among said plural kinds of density correction tables based on output states of said neural network circuit, wherein said output states include a plurality of output values, including:
a first output value indicating a likelihood of a character document;
a second output value indicating a likelihood of a photographic document; and
a third output value indicating a likelihood of a color background document.

8. The image processing apparatus as set forth in claim 7, wherein each plurality of output values includes a respective predetermined value, and:

a density correction table for character documents is selected when said first output value is greater than said respective predetermined value, and said second and third output values are less than their said respective predetermined values;
a density correction table for photographic documents is selected when said second output value is greater than said respective predetermined value, and said first and third output values are less than their said respective predetermined values; and
a density correction table for color background documents is selected when said third output value is greater than said respective predetermined value, and said first and second output values are less than their said respective predetermined values.

9. The image processing apparatus as set forth in claim 8, wherein when none of said plurality of output values are greater than their said respective predetermined values; a density correction table prepared in consideration of two kinds of image characteristics is selected.

10. The image processing apparatus as set forth in claim 1, further comprising:

memory means for storing image signals obtained by scanning plural lines of the document, and outputting stored image signals to said feature data extraction means and said density correction means line by line.

11. The image processing apparatus as set forth in claim 1, wherein:

said density correction means additionally prepares a density correction table in accordance with the image recognition information in reference to said plural kinds of density correction tables stored beforehand when there is no density correction table corresponding to inputted image recognition information, so that the density of the image signals is corrected based on the additionally prepared density correction table.

12. The image processing apparatus as set forth in claim 1, wherein:

said feature data extraction means extracts the feature data based on the image signals line by line, and
said density correction means applies a density correction to the image signals line by line.

13. The image processing apparatus as set forth in claim 12, further comprising:

average means which receives feature data of several lines before a line currently subjected to a density correction from said feature data extraction means, and takes an average of the feature data of several lines to be outputted to said image recognition means as new feature data.

14. The image processing apparatus as set forth in claim 13, wherein:

said density correction means is composed of a neural circuit network arranged so as to learn a density correction process beforehand by inputting feature data, obtained by taking an average of the feature data of several lines processed before the line currently subjected to the density correction, and stored information with regard to the density correction tables for several lines.

15. The image processing apparatus as set forth in claim 12, said density correction means stores contents of the density correction tables for several lines processed before the line currently subjected to the density correction and applies thereto the density correcting based on information with regard to a selected density correction table and information with regard to the density correction tables for several lines.

16. The image processing apparatus as set forth in claim 12, wherein:

said feature data extraction means extracts weighted average feature data obtained by increasing a weight toward the line currently subjected to the density correction as new feature data.

17. The image processing apparatus as set forth in claim 12, wherein:

said feature data extraction means extracts the feature data from image signals in a predetermined range of a line.

18. An image processing apparatus, comprising:

feature data extraction means for extracting feature data indicative of density characteristics of a document from image signals obtained by scanning the document;
characteristic representing value arithmetic means composed of a neural circuit network which is learned beforehand such that a characteristic representing value in accordance with density characteristic of the document is outputted therefrom based on the feature data; and
density correction means for preparing a new density correction table in accordance with image characteristics based on the characteristic representing value, and applies a density correction to image signals based on the density correction table,
wherein said feature data extraction means outputs information indicative of a density distribution of the document based on the image signals as the feature data, wherein said information indicative of the density distribution of the document is density histogram information, and further including means for reducing the density histogram information while maintaining the information indicative of the density distribution, wherein the density histogram information is reduced based on a plurality of threshold values being set in stages.

19. An image processing apparatus, comprising:

feature data extraction means for extracting feature data indicative of density characteristics of a document based on image signals obtained by scanning the document;

image recognition means composed of a neural circuit network which is learned beforehand so as to recognize image characteristics of the document based on the feature data; and density correction means for correcting the density of the image signals in accordance with the image characteristics based on the image recognition information from said image recognition means, wherein said feature data extraction means outputs information indicative of a density distribution of the document based on the image signals as the feature data, wherein said information indicative of the density distribution of the document is density histogram information, and further including means for reducing the density histogram information while maintaining the information indicative of the density distribution, wherein said reducing means includes
    means for setting a plurality of first threshold values step-by-step, each first threshold value being a respective density value,
    means for comparing the image signals with the first threshold values, and
    means for comparing the image signals with the first threshold values, and accumulating numbers of pixels in respective density ranges defined by successive first threshold values,
    means for setting a plurality of second threshold values step-by-step, each second threshold value being a respective frequency value, and
    means for comparing the number of pixels in each respective density range with the second threshold values for determining a closest second threshold value for each respective density range, and converting the number of pixel in each respective density to the determined closest second threshold value.

20. An image processing apparatus, comprising:

feature data extraction means for extracting feature data indicative of density characteristics of a document from image signals obtained by scanning the document;

characteristic representing value arithmetic means composed of a neural circuit network which is learned beforehand such that a characteristic representing value in accordance with density characteristics of the document is outputted therefrom based on the feature data; and density correction means for preparing a new density correction table in accordance with image characteristics based on the characteristic representing value, and applies a density correction to image signals based on the density correction table, wherein said feature data extraction means outputs information indicative of a density distribution of the document based on the image signals as the feature data, wherein said information indicative of the density distribution of the document is density histogram information, and further including means for reducing the density histogram information while maintaining the information indicative of the density distributions wherein said reducing means includes
    means for setting a plurality of first threshold values step-by-step, each first threshold value being a respective density value,
    means for comparing the image signals with the first threshold values, and accumulating numbers of pixel in respective density ranges defined by successive first threshold values,
    means for setting a plurality of second threshold values step-by-step, each second threshold value being a respective frequency value, and
    means for comparing the number of pixels in each respective density range with the second threshold values for determining a closest second threshold value for each respective density range, and converting the number of pixels in each respective density range to the determined closest second threshold value.

* * * * *